US012638379B2

(12) United States Patent
Bellemare et al.

(10) Patent No.: US 12,638,379 B2
(45) Date of Patent: May 26, 2026

(54) SYSTEM AND METHOD TO MEASURE MATERIAL DUCTILITY AND TOUGHNESS USING CUTTING BLADES

(71) Applicant: Massachusetts Materials Technologies LLC, Natick, MA (US)

(72) Inventors: Simon C. Bellemare, Weston, MA (US); Ryan Lacy, Somerville, MA (US); Brendon Willey, Waldoboro, ME (US); Bryan Feigel, Waltham, MA (US)

(73) Assignee: Massachusetts Materials Technologies LLC, Natick, MA (US)

( * ) Notice: Subject to any disclaimer, the term of this patent is extended or adjusted under 35 U.S.C. 154(b) by 393 days.

(21) Appl. No.: 18/300,275

(22) Filed: Apr. 13, 2023

(65) Prior Publication Data

US 2023/0333004 A1 Oct. 19, 2023

Related U.S. Application Data

(60) Provisional application No. 63/330,412, filed on Apr. 13, 2022.

(51) Int. Cl.
*G01N 19/02* (2006.01)
*G01N 3/42* (2006.01)

(52) U.S. Cl.
CPC ............... *G01N 19/02* (2013.01); *G01N 3/42* (2013.01)

(58) Field of Classification Search
CPC ........... G01N 19/02; G01N 2203/0053; G01N 2203/0676; G01N 3/42; G01N 3/28; G01N 2203/0067
See application file for complete search history.

(56) References Cited

U.S. PATENT DOCUMENTS 6,053,034 A * 4/2000 Tsui .......................... G01N 3/42
977/700
7,669,508 B2 * 3/2010 Gardiner ................. B23B 27/20
82/123

(Continued)

FOREIGN PATENT DOCUMENTS

CN 115406758 A * 11/2022 ............... G01N 3/04

OTHER PUBLICATIONS

Palkovic et al., "Calibration of a Nondestructive Toughness Tester (NDTT) for Measuring Fracture Toughness of Pipeline Steel," Proceedings of the 2018 12th International Pipeline Conference (IPC 2018), vol. 1: Pipeline and Facilities Integrity; Calgary, Alberta, Canada (Sep. 24-28, 2018), DOI: 10.1115/IPC2018-78538, 6 pages.

(Continued)

*Primary Examiner* — Octavia Hollington
(74) *Attorney, Agent, or Firm* — Barclay Damon LLP

(57) ABSTRACT

A material toughness testing apparatus includes a stylus having at least two cutting blades configured to engage with the sample and spaced apart to define a stretch passage therebetween and a stylus transport system configured to move the stylus along a path trajectory as the cutting blades cut the sample such that the sample is displaced on at least one side of the path trajectory. Each cutting blade has a blade dive surface and a blade lift surface that intersect to form a cutting edge configured to cut the sample along the path trajectory. Each blade dive surface and blade lift surface is configured to contact the sample when cutting the sample. The stylus is configured to separate the sample and configured to form a ligament in the stretch passage and to induce tension in the ligament due to opposing forces of the cutting blades and the sample.

20 Claims, 41 Drawing Sheets

(56)  References Cited

U.S. PATENT DOCUMENTS

| | | | | |
|---|---|---|---|---|
| 7,878,071 | B2 * | 2/2011 | Greer .................. | G01Q 60/366 |
| | | | | 73/777 |
| 11,378,502 | B2 * | 7/2022 | Bellemare ............... | G01N 3/46 |
| 2016/0370272 | A1 | 12/2016 | Bellemare et al. | |
| 2018/0275035 | A1 | 9/2018 | Bellemare et al. | |

OTHER PUBLICATIONS

Palkovic et al., "Nondestructive Evaluation of Metal Strength, Touchness, and Ductility Through Frictional Sliding," Proceedings of the ASME 2019 Pressure Vessels & Piping Conference (PVP2019), vol. 6A: Materials and Fabrication; San Antonio, Texas, USA (Jul. 14-19, 2019), DOI: 10.1115/PVP2019-93770 (2019), 9 pages.
International Search Report and Written Opinion in Application No. PCT/US2023/018556 dated Aug. 1, 2023, 14 pages.

* cited by examiner

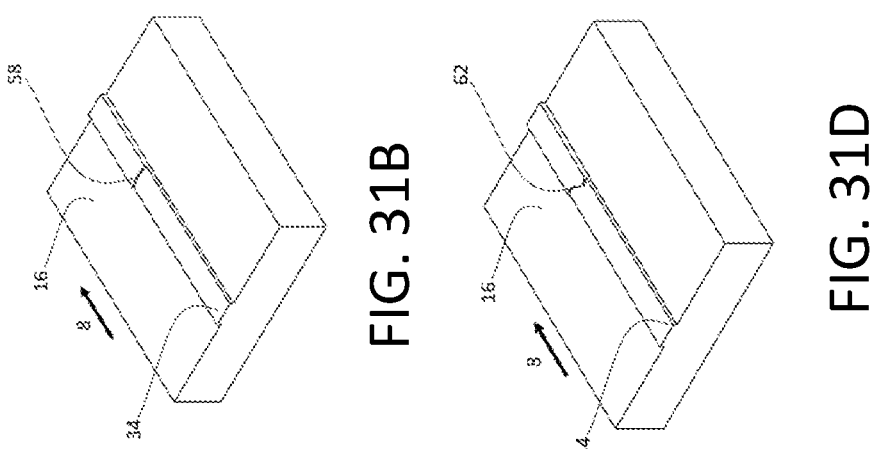
FIG. 31B
FIG. 31D
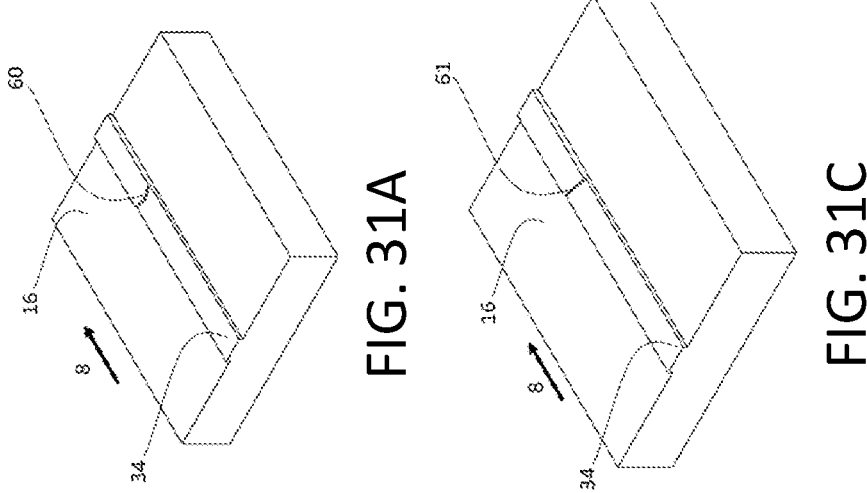
FIG. 31A
FIG. 31C

SYSTEM AND METHOD TO MEASURE MATERIAL DUCTILITY AND TOUGHNESS USING CUTTING BLADES

CROSS REFERENCE TO RELATED APPLICATIONS

The present application claims the benefit of U.S. Provisional Patent Application No. 63/330,412 filed Apr. 13, 2022, the disclosure of which is incorporated by reference herein in its entirety.

TECHNICAL FIELD

The present invention relates to the use of material deformation to gain material ductility and toughness characteristics information related to how a material resists micromodifications when subjected to a stress field that includes tensile stresses in at least one direction.

BACKGROUND ART

U.S. Patent Application Publication No. 2018/0275035 entitled "Measurement of Material Properties under Local Tensile Stress through Contact Mechanics" describes the background art and is incorporated by reference herein in its entirety. Specifically, the publication describes an apparatus and its use for performing a contact mechanics test in a substrate. The apparatus includes a stylus having at least two contact elements, each contact element having contact profiles, the contact elements are separated by a calibrated distance in the stylus to define a stretch passage therebetween. The stylus is configured to deform the substrate so as to cause the substrate to flow between the contact elements and induce tension in the substrate within a stretch passage to generate and preserve micromodifications in the substrate that result from material deformation. The stylus geometry may be defined by traditional machining tool geometry with a rake angle that may be fixed or variable. A stylus designed in this manner for use in a frictional sliding model is designed with contact elements, each with a contact profile, and at least one relief angle. Styluses with smaller rake angles (nearly perpendicular to the sample surface) provide a faster rate of tensile stress in the ligament as material flowing around the stretch passage is pushed up the contact profile. Styluses with relief angles result in less material in contact with the substrate, and less frictional support as a result. The stylus may have two contact elements, each with a contact profile configured to deform the substrate.

The apparatus and methodologies described in U.S. Pat. No. 11,378,502 have been validated in the publication "PR-610-183867-R01 Fracture Toughness via In-Ditch Non-Destructive Testing—Validation" by Palkovic et al. published on Sep. 8, 2020 through Pipeline Research Council International. An advantage of the technique when compared to surface indentation testing or microtensile specimen testing is the use of the stylus to cause material flow along the stretch passage.

U.S. Patent Application Publication No. US2010/281963 discloses an indenter tip that is modified to permit both compression testing and tensile testing on samples. The modified indenter tip has both a surface that can be used to apply compressive forces, and tines that can be used to engage a free end of a specimen to be tested in tension. The apparatus also includes elements of a microindenter that provide mechanical manipulation of the relative position and orientation of the modified indenter tip and of the specimen to be tested, as well as the necessary controls and instrumentation to perform the test and to collect, record and manipulate data.

SUMMARY OF THE EMBODIMENTS

Embodiments of the present invention describe an apparatus for measuring material toughness in a sample using a contact mechanics test that evaluates the material deformation of the sample, the displacement of a sample surface, and the cutting resistance of the sample with the material response being probed near the material deformation. The material toughness testing apparatus includes a stylus having at least two cutting blades configured to engage with the sample and spaced apart at a calibrated distance to define a stretch passage between two adjacent cutting blades. The apparatus further includes a stylus transport system configured to move the stylus along a path trajectory as the at least two cutting blades cut the sample such that the sample is displaced on at least one side of the path trajectory. Each cutting blade has a blade dive surface and a blade lift surface that intersect to form a cutting edge that causes material separation of the sample along the path trajectory to form at least two new surfaces, called cut or cutting surfaces. Each blade dive surface and blade lift surface is configured to contact the sample when cutting the sample. The stylus is configured to separate the sample at or near the cutting edge of each cutting blade when the stylus transport system moves the stylus and configured to form a ligament in the stretch passage when the sample flows between the two adjacent cutting blades and to induce tension in the ligament due to opposing forces of the cutting blades and the sample.

Embodiments of the present invention with a stylus having cutting blades with both a blade lift surface and a blade dive surface that are configured to contact the sample during the contact mechanics test provide multiple benefits over prior geometries through the addition of another frictional contact surface that (i) reduces the risk of unintentional path trajectories, such as over-penetration of the sample, (ii) enables cutting blades with sharper cutting edges that allow the material to stretch more in tension and less in shear, (iii) enables sharper cutting edges without increased stylus failure, and (iv) improves the sample material response by reducing the probability of shear fracture and creating sample deformation at or near the cutting edges ahead of the stretch passage. The sample may then be analyzed to characterize the fracture toughness and other mechanical and physical properties of the material.

In related embodiments, the stylus may further include geometric design features to minimize the sample shear response during a contact mechanics test. Such features may include bent, curled, or vertical edges of the stylus. The apparatus may be further designed to have features to align and orient the stylus relative to the sample.

In related embodiments, the method may further include sample surface preparation to benefit the initialization and termination of a contact mechanics test and control of the path trajectory. The method may further include the preparation of a test structure in the sample surface to create a repeatable sampling area on the surface or a feature, such as a notch or a groove, into the sample for the initialization of a contact mechanics test. The test structure sampling area or feature can be machined, ground, formed or created through similar manufacturing methods.

In related embodiments, the method may further include an apparatus to articulate the stylus and initialize engagement between the stylus and the sample from a different position than with the test direction of travel. This method may further include an apparatus to disengage the stylus from the sample, ending the contact mechanics test.

In related embodiments, the apparatus may further include a set of sensors configured to measure a set of features associated with the deformation of the sample. The stylus transport system may further include an actuator configured to supply linear motion and/or rotational motion to the stylus. The apparatus may further include a set of strain gauges or load cells, coupled to the stylus, configured to measure forces associated with frictional sliding in the sample during a frictional sliding test. The apparatus may further include a stylus steering system coupled to the stylus transport system and configured to move the stylus in any direction relative to the sample. The apparatus may further include a sample reference system coupled to the stylus and configured to maintain a reference of the stylus relative to the sample surface. The apparatus may further include at least one lateral support coupled to the stylus and configured to provide increased strength to the stylus. The apparatus may further include a sample surface measurement device coupled to the stylus transport system and configured to measure characteristics of the sample associated with deforming the sample as the stylus travels. The stylus transport system may further be configured to provide movement of the stylus for an indentation test. At least one cutting blade may include a blunting surface along the cutting edge and/or at one end of the cutting edge adjacent to the stretch passage. At least one cutting blade may include one or more flow-constraining passages configured to limit the flow of the sample into the stretch passage.

In accordance with another embodiment of the invention, a method for measuring material toughness in a sample using a contact mechanics test includes providing the apparatus described above, causing the stylus to engage with the sample, and moving the stylus to perform the contact mechanics test to generate a residual sample surface in the sample and to preserve the residual sample surface in order to provide material toughness measurements of the sample.

In related embodiments, the residual sample surface may be formed above and below the cutting edge of the stylus. The method may further include forming a notch in the sample before causing the stylus to engage with the sample and then causing the stylus to engage with the notch. The method may further include measuring characteristics of the residual sample surface associated with deforming the sample. The method may further include measuring reaction forces on the stylus as the stylus deforms the sample. The method may further include using test conditions and material toughness measurements to determine the material toughness of the sample. The test conditions may include stretch passage width, stylus velocity, stylus depth relative to a surface of the sample and/or sample temperature. The method may further include using the material toughness measurements and a K-correlation factor to determine the material toughness of the sample. The method may further include forming a sampling area test structure in the surface of the sample before causing the stylus to engage with the sample, the test structure may have a test sample configured to engage with the at least two cutting blades. The sampling area test structure forms a U-shape or O-shape in the surface of the sample. The method may further include removing at least a portion of the test sample from the surface.

BRIEF DESCRIPTION OF THE DRAWINGS

The foregoing features of embodiments will be more readily understood by reference to the following detailed description, taken with reference to the accompanying drawings, in which:

FIG. 23A shows the apparatus positioned on a sample surface and supported by a test support structure. FIG. 23B shows the apparatus without the test support structure.

FIGS. 31A-31D are schematics of a crack front profile showing chevron, hourglass, slant, and undefined profiles, respectively, according to embodiments of the present invention.

FIG. 33A shows the path trajectory of the stylus across the interface of the materials. FIG. 33B shows the path trajectory along the interface of the materials.

DETAILED DESCRIPTION OF SPECIFIC EMBODIMENTS

Figure 1:
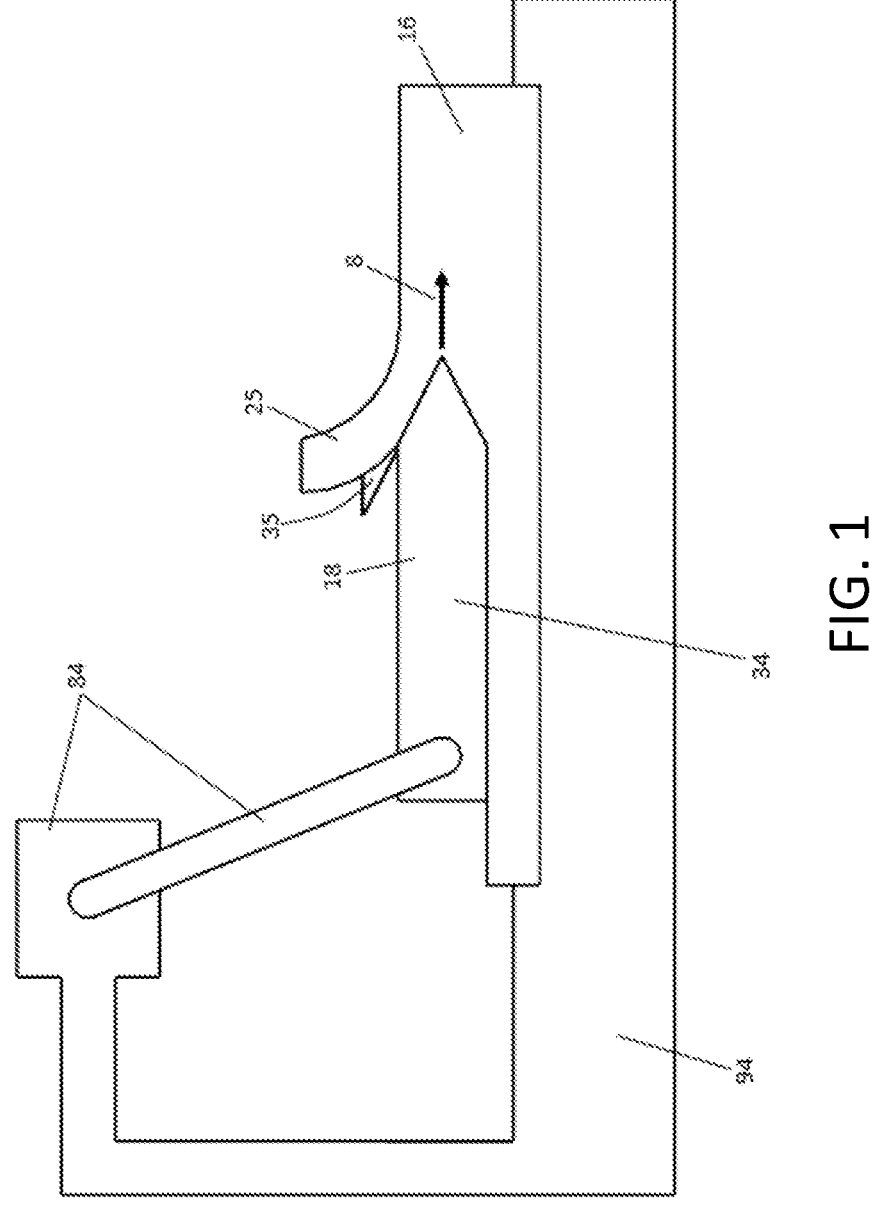
FIG. 1 is a schematic of a material toughness testing apparatus having a stylus and a stylus transport system positioned on a sample surface and supported by a test support structure according to embodiments of the present invention.

Definitions. As used in this description and the accompanying claims, the following terms shall have the meanings indicated unless the context otherwise requires:

A "contact mechanics test" is the use of localized deformation to probe the mechanical response of a material while the rest of the sample remains unchanged. Specific implementations include an "indentation test" where a hard stylus deforms the surface of a softer sample by moving perpendicular to a large sample surface. Another implementation is a "frictional sliding test" where a hard stylus deforms the surface of a softer sample while moving the stylus along a path trajectory relative to the sample surface. The contact mechanics test may be in an indentation mode, where a stylus is pressed into the sample, and/or a frictional sliding mode, where the stylus travels laterally along a sample surface. In both cases, the contact mechanics test may result in material separation or removal.

A "sample" is the material probed for mechanical properties through a contact mechanics test.

A "sample set" is a grouping of samples being probed for mechanical properties through a contact mechanics test that includes at least one sample.

A "stylus" is an element engaging the sample.

A "path trajectory" is a physical path and relative orientation of the stylus with respect to the sample that the stylus follows during a contact mechanics test.

A "cutting blade" is a component of the stylus that engages with the sample. A stylus has two or more cutting blades. Each cutting blade has a blade dive surface and a blade lift surface that intersect to form a cutting edge. The cutting edge is configured to cut the sample along the path trajectory. The cutting edge and the path trajectory define a cutting surface. Each cutting blade has a profile that is shaped to induce flow in the sample. A profile may be straight, sloped, convex, concave, continuous, or discontinuous depending on the intended deformation mode of the sample. A cutting blade may include one or more profiles.

A "friction surface" is a surface on a cutting blade that contacts the sample and engages in frictional sliding with the sample.

A "blade dive surface" is a friction surface of the cutting blade that contacts the sample.

A "blade lift surface" is a friction surface of the cutting blade that contacts the sample and is oriented opposite to the blade dive surface to create a reaction force between the blade lift surface and blade dive surface.

A "cutting edge" is a portion of the stylus formed by the intersection of the blade dive surface and the blade lift surface. The stylus separates and cuts the sample at or near the cutting edge.

A "stretch passage" is a geometrical space within the stylus defined as the gap between two or more cutting blades that allows the sample to flow between the cutting blades to induce tension in the sample for generating and preserving micromodifications. The stretch passage may be inherent to a stylus or may be formed by the separation between two or more cutting blades.

A "stylus reference line" is a reference line in relation to the shape of the stylus and configured to define the dive angle and lift angle.

A "dive angle" is an angle defined by the blade dive surface and the stylus reference line.

A "lift angle" is an angle defined by a blade lift surface and a stylus reference line.

A "residual sample surface" is a surface of the sample that includes a characteristic that remains in the sample, or a change in the sample, after a contact mechanics test. Each residual sample surface may contain, (i) a "microcrack" which is the creation of new surfaces in the sample having an initiation position, length, and direction, (ii) a "microstructural change" which is any change in the internal structure of the material. This includes, but is not limited to, the volume fraction of each crystalline structure, crystallographic and molecular texture, the free volume in the material, the molecular arrangement, and work hardening, (iii) a "microvoid" which is the creation of additional space in the material such as crazes, interface debonding, and other phenomena generally associated with tension in the material, and (iv) a "micromodification" which is any combination of microcracks, microvoids, or other change in the sample. Micromodifications include microstructure changes, microvoid formation, cracking, and macrostructural changes, such as changes in the height and/or width of the sample surface near the stylus, due to the contact mechanics test. Tensile stress is generated with a stylus designed to stretch the material and promote the formation of the micromodifications.

(v) a "ligament" is a portion of the material that formed, or remained on the sample surface, due to the presence of a stretch passage during the contact mechanics test.

(vi) a "fracture surface" is a portion of the material that formed inside the stretch passage of the sample due to the separation of the sample during the contact mechanics test.

A "chip" is a portion of material that is separated, partially or completely, from the sample during the contact mechanics test.

A "residual chip surface" is a surface of the chip that includes characteristics such as those of the residual sample surface, including microcracks, microvoids, micromodifications, and fracture surfaces.

A "ligament height" is a measurement of the positional difference between the ligament and an adjacent cut surface.

A "lateral support" is a geometrical feature that provides additional rigidity or strength to a friction surface.

A "set" includes at least one member.

A "machined surface" is a surface that has been modified to achieve a desired geometry by machining, electrical discharge machining, chemical etching or masking, abrasive processes, ion beam machining, or other methods.

A "flow constraining passage" is a raised or lowered geometry on the blade lift surface and/or blade dive surface running parallel or at a desired angle to the path trajectory. The flow constraining passage can be positive, disposed above the surface of the stylus or negative, disposed below the surface of the stylus.

A "free surface" is a surface of the sample which is located adjacent to open space.

A "cut surface" or "cutting surface" is a portion of the residual sample surface or the residual chip surface that results from the passage of the cutting edge through the sample along the path trajectory. The cut or cutting surface refers to the residual sample surface or the residual chip surface that comes directly in contact with the cutting edge of the cutting blades.

A "crack front profile" is a feature of the residual sample surface located along the ligament, perpendicular to the path trajectory, at the place where separation of the sample material occurs, which follows the cutting edge as the cutting blades move through the sample. Each crack front profile may take the form of, (i) A "hourglass" which is a bowed geometry wherein the furthest point of the crack front profile relative to the cutting edge is near the centerline of the ligament, (ii) A "chevron" which is a 'v-shaped' geometry wherein the tip of the 'v' is along the center while the two stems are closest to the edge and colinear. If the chevron points to the cutting edge, the chevron is considered a "positive chevron". If the chevron points away from the cutting edge, the chevron is considered a "negative chevron", (iii) A "slant" which is a diagonal geometry wherein the nearest and furthest points of the crack front occur at the edges of the ligament and the cut surface.

(iv) An "undefined profile" which conforms to none of the prior profile geometries.

A "crack arrest profile" is the crack front profile in an unloaded configuration.

A "crack tip" is a feature on the residual sample surface or the residual chip surface where the sample separates, usually through accumulation of micromodifications, into two separate surfaces at a location within the stretch passage or near the stretch passage. The crack tip is not formed by the cutting edge of the cutting blades separating and cutting the sample.

A "crack tip profile" is a cross section of the crack oriented perpendicular to the cut surface, at the location of the crack tip. This includes the shape of the free surface up to and including the crack tip, as well as the region between the crack tip and the cutting edge.

A "lag" is a measurement of the positional difference between the location of the cutting edges of the cutting blades and the location of the crack tip generally measured perpendicular to the cutting edges. The lag can be positive when the cutting edge is in front of the crack tip, or negative when the crack tip is in front of the cutting edge along the path trajectory.

A "crack opening displacement" is a micromechanical feature on the crack tip profile, which includes the amount of separation occurring in a material immediately behind the crack tip.

A "blunting surface" is a friction surface of a cutting blade included to reduce the stress subjected to the cutting blade and/or sample in high stress concentrated areas. The blunting surface may help to reduce damage to the cutting blades. Blunting surfaces may act as blade dive and/or blade lift surfaces.

A "stylus transport system" is a system designed to actively or passively move the stylus through a prescribed path trajectory and may include, (i) An "actuator" which supplies linear or rotational motion, (ii) A "displacement transfer assembly" which translates the motion of the actuator to the stylus either directly or by transforming the motion into a useable form (e.g., circular motion into linear motion), (iii) A "stylus steering system" is a system to allow the stylus to move in any direction, either passively by the asymmetric forces imparted to the stylus by the sample or actively by prescribing a path trajectory for the stylus and allowing the stylus to move along the path trajectory. The stylus steering system enables a variable cut surface and may allow a reduction in the internal stresses imparted to the stylus.

(iv) A "pivoting mechanism" is a mechanism which allows the stylus to rotate either directly or through rotational motion supplied by the actuator, displacement transfer assembly, or the stylus steering system or some combination thereof.

(v) A "sample reference system" is a system that determines the initial stylus position by referencing the sample position and placing the stylus in relationship to a single or a collection of features of the sample. Once the initial position of the stylus is determined, the stylus path trajectory may be determined through the stylus steering system.

A "test support structure" is a structure that provides structural support for the components of the apparatus conducting a contact mechanics test and may provide structural support for the sample if necessary.

A "sample compression element" is a component of the stylus or coupled to the stylus and designed to prevent fracture ahead of the cutting edges for low-toughness materials.

A "K-correlation" is a correlation between a combination of the yield strength of a sample material and the square root of the ligament height and the elastic plane strain fracture toughness of the sample, commonly defined as $K_{Ic}$.

A "J-correlation" is a correlation between a combination of the yield strength of a sample material and the square root of the ligament height and the elasto-plastic plane strain fracture toughness of the sample, commonly defined as $J_{Ic}$.

A "Charpy V-Notch correlation" is a correlation between a combination of yield strength of a sample material and square root of the ligament height and the impact energy absorbed of the sample.

A "fracture toughness" is a general name for the capacity of a substrate to resist the growth of micromodifications. Within this application, we refer to similar material capacities as "micromodification resistance" or "resistance to micromodifications." In engineering literature, the fracture toughness may be referred to as the critical energy release rate, critical stress intensity factor, and critical J-integral. Additional related terms are the surface energy for perfectly brittle materials and fracture energy for materials that undergo inelastic dissipation. When the fracture toughness is not constant, but is a function of micromodification extension, it is known as a resistance curve (R-curve or J-curve). Another empirical measurement of fracture toughness is the CVN energy from Charpy Impact tests (or Charpy V-Notch) that can be used as an index for ranking materials of similar specimen size and testing conditions.

Overview of Apparatus, Methods and Applications

DETAILED DESCRIPTION OF THE APPARATUS

Embodiments of the present invention involve a stylus and a stylus transport system configured to move the stylus to deform and locally fracture the sample using a contact mechanics test.

FIG. 1 shows an overview of a material toughness testing apparatus for measuring material toughness in a sample 16 using a contact mechanics test. The apparatus includes a stylus 18 configured to engage with a sample 16 and a stylus transport system 84 configured to move the stylus 18 along a path trajectory 8 during the contact mechanics test, causing a material response in the sample 16 and causing the sample 16 to separate leaving a residual sample surface 34 and a residual chip surface 35. A test support structure 94 provides structural support for the stylus transport system 84 and holds the apparatus on the sample 16 to provide a reference position with respect to the sample 16.

Figure 2:
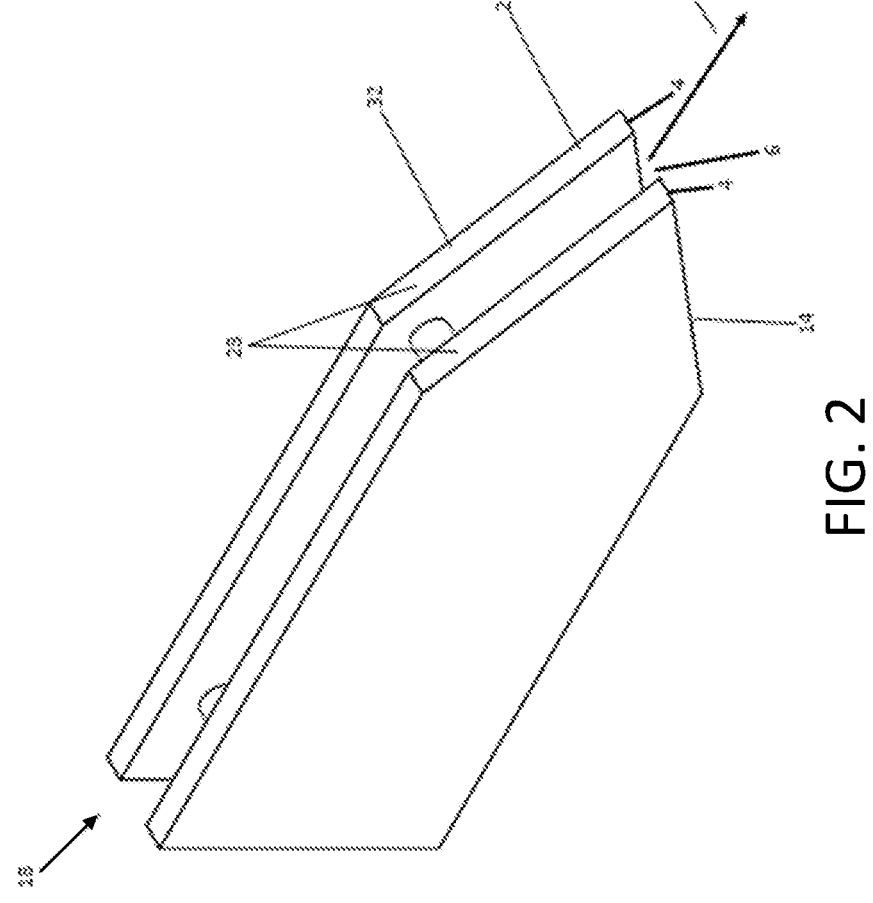
FIG. 2 is a schematic of a stylus having two cutting blades separated by a stretch passage according to embodiments of the present invention. Each cutting blade has a blade dive surface and a blade lift surface which intersect to form a cutting edge.

FIG. 2 shows a schematic of a stylus 18 configured to conduct a contact mechanics test. The stylus 18 includes at least two cutting blades 28 configured to engage with the sample 16 and separated by a distance forming a stretch passage 6 between the cutting blades 28. The cutting blades 28 may be separate components and connected to one another, as shown in FIG. 2, or may be formed from one component separated by the stretch passage 6, as shown and described below in FIG. 3. Each cutting blade 28 has a blade dive surface 2 and a blade lift surface 14 that intersect to form a cutting edge 4 configured to cut the sample 16 as the stylus 18 travels along the path trajectory 8. Each blade dive surface 2 and blade lift surface 14 is configured to contact the sample 16 when the cutting edges 4 on each cutting blade 28 cut the sample 16. The stylus 18 is configured to separate the sample 16 at or near the cutting edges 4 when the stylus 18 travels along the path trajectory 8 leaving a residual sample surface 34 and a residual chip surface 35. Material deformed within and near the stretch passage 6 is subjected to tensile stresses which cause a crack to form in the sample 16.

Figure 3:
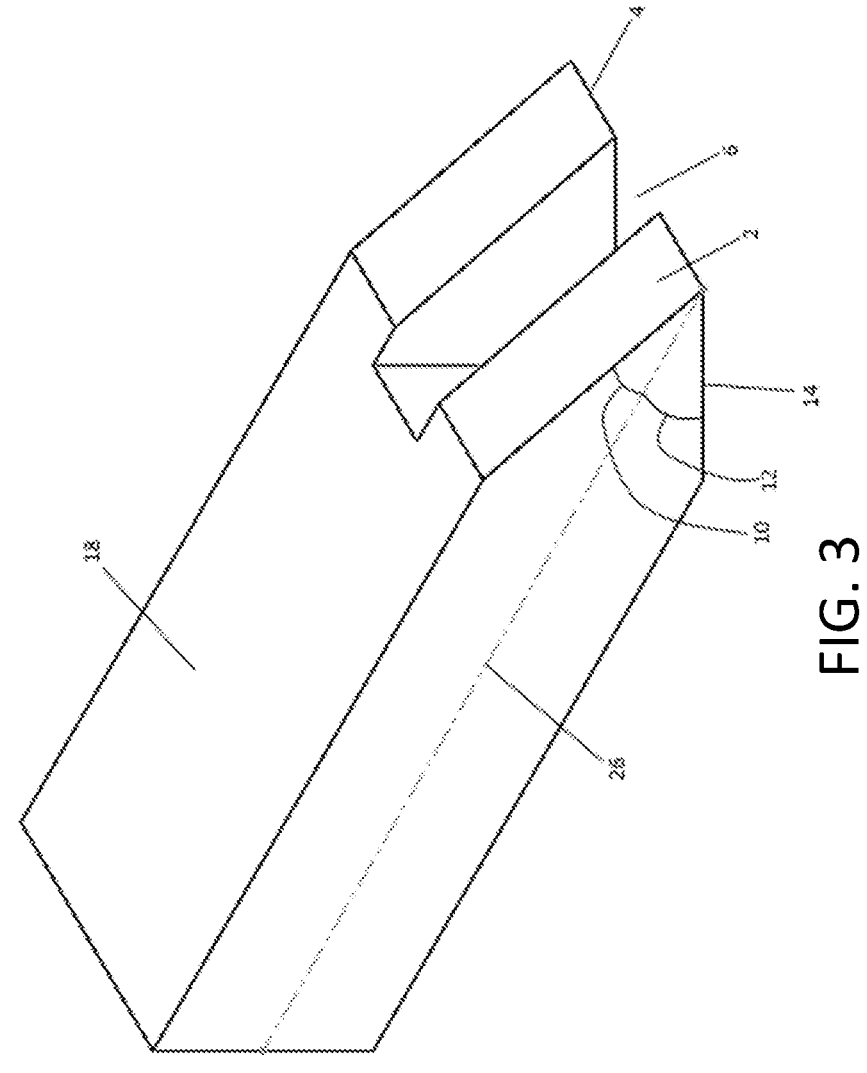
FIG. 3 is a schematic of a stylus having two cutting blades with a stretch passage according to embodiments of the present invention. The stylus has a blade dive surface and blade lift surface which are defined by dive and lift angles, respectively, with respect to a stylus reference line.

FIG. 3 shows a schematic of a stylus 18 formed from one component rather than an assembly of individual cutting blades 28, which reduces the challenge of the relative alignment of the individual cutting blades 28. The stylus 18 includes at least two cutting blades 28 that have been manufactured from a solid block of material by forming a stretch passage 6 between the two cutting blades 28. Each cutting blade 28 has a blade dive surface 2 and a blade lift surface 14, which may be formed at a dive angle 10 and lift angle 12, respectively, with respect to a stylus reference line 26. The width of the stretch passage 6 and the angle of the dive angle 10 and the lift angle 12 may be modified to optimize the stylus geometry for variable testing parameters such as material type, test depth, etc.

Figure 4B:
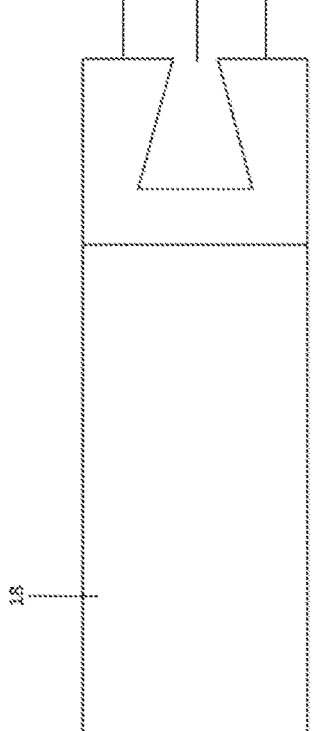
FIGS. 4A and 4B are schematics of an isometric view and top view, respectively, of a stretch passage according to embodiments of the present invention. The stretch passage is formed by a calibrated distance between two cutting blades. The space between the interior walls increases with the distance from the cutting edge as shown in FIGS. 4A and 4B, although the distance between these two walls may increase, remain constant, or decrease with distance from the cutting edge.
Figure 4A:
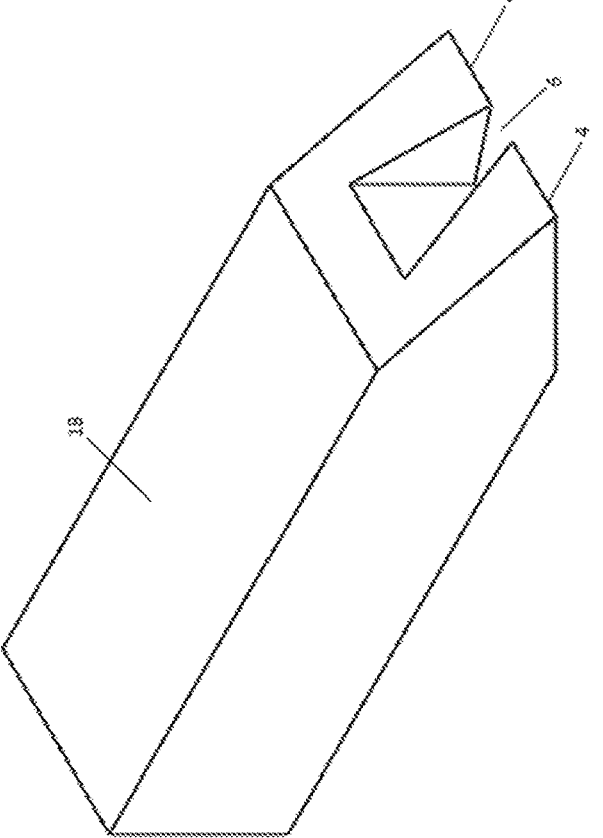

The stretch passage 6 is formed by a space between two adjacent cutting blades 28, with the distance between the adjacent cutting blades 28 remaining relatively constant along the length of the stretch passage 6, as shown in FIGS. 2 and 3, or varying along the length of the stretch passage 6, as shown in FIGS. 4A and 4B. For example, the width of the stretch passage 6 may increase from the cutting edges 4 towards the rear of the stretch passage 6. This shape of the stretch passage 6 creates space for a ligament 22 to travel through the stretch passage 6 without contacting the inner walls of the cutting blades 28 that face the stretch passage 6 and reduces the risk for ligament 22 damage from the stylus 18.

Figure 5:
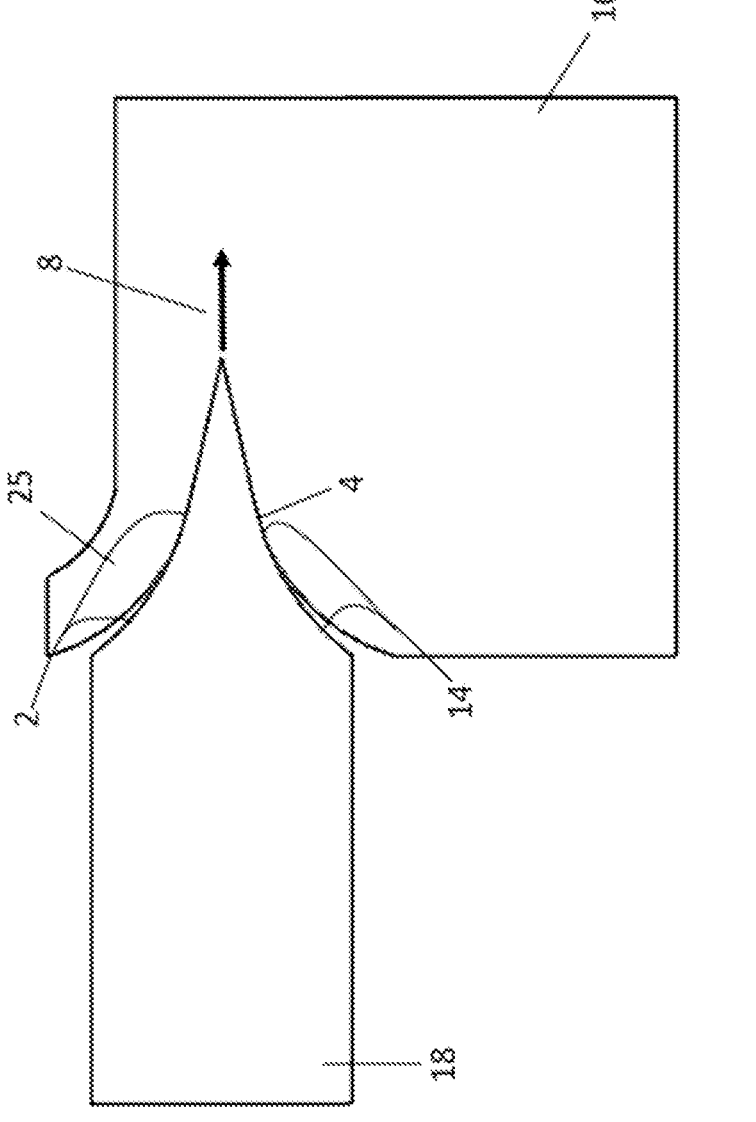
FIG. 5 is a schematic side view of a stylus with multiple profiles engaging a sample according to embodiments of the present invention.

FIG. 5 shows a side view of a stylus 18 engaged with the sample 16. As shown, the blade dive surface 2 and the blade lift surface 14 of one or more cutting blades 28 may have one or more profiles, e.g., straight and/or curved, and the cutting blades 28 may have different profiles from one another, depending on the intended deformation mode of the sample 16. For example, as shown in FIG. 5, the blade dive surface 2 and the blade lift surface 14 may each have two profiles, one sloped and one curved. Multiple profiles may create many testing benefits. For example, the profile shapes of the stylus 18 may generate the potential to reduce the friction experienced by the stylus 18 on friction surfaces by reducing the overall contact area. The profile shapes may also be utilized to direct the flow and formation of a chip. The profile shapes can also be utilized to increase stress at the crack tip. For example, profile shapes that form one or more blunting surfaces 78 may reduce wear and microfracture of the cutting edge 4. Profile shapes that have a portion of the cutting blades 28 thicken with the distance to the cutting edge 4 may reduce bending stresses.

Figure 6B:
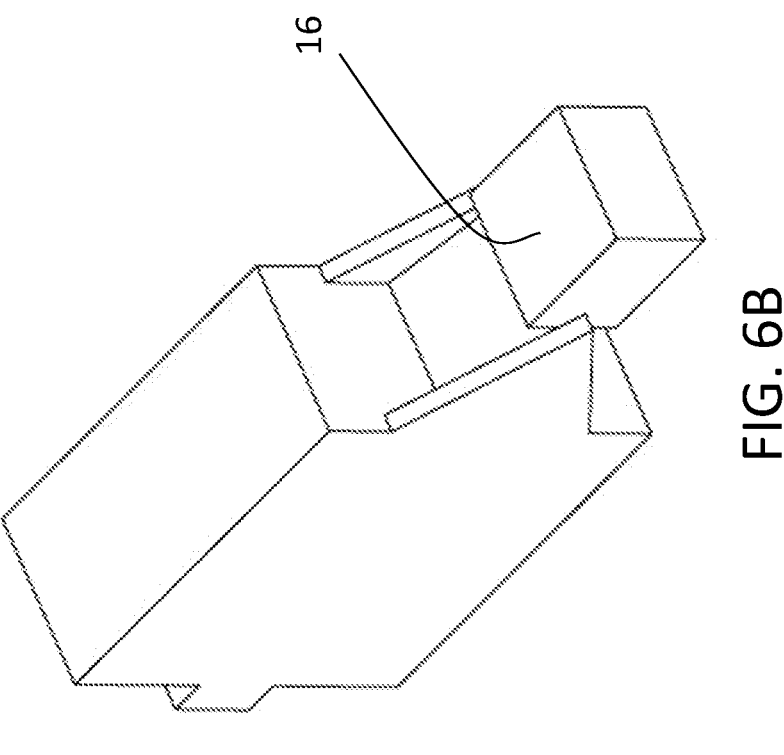
FIGS. 6A and 6B are schematics of a stylus with a stretch passage and lateral supports attached to the cutting blades of the stylus according to embodiments of the present invention.
Figure 6A:
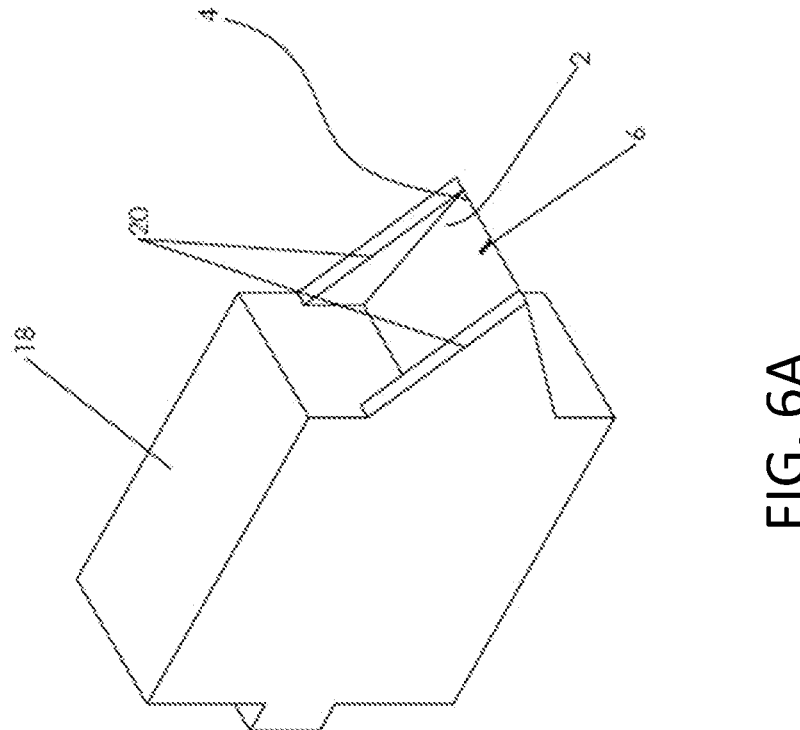

FIGS. 6A and 6B show schematics of a stylus 18 with or coupled to one or more lateral supports 20 on one or both sides of the cutting blades 28, shown without the sample 16 and engaged with the sample 16, respectively. The purpose of the one or more lateral supports 20 is to provide increased strength to the stylus 18 and reduce the bending stress and deflection of the stylus 18 or components of the stylus 18, particularly the cutting edges 4. The internal spacing between the lateral supports 20 can be sized such that the lateral supports 20 interact with the outer walls of the sample 16, but the lateral supports 20 do not inhibit the form and functionality of the stretch passage 6.

Figure 7C:
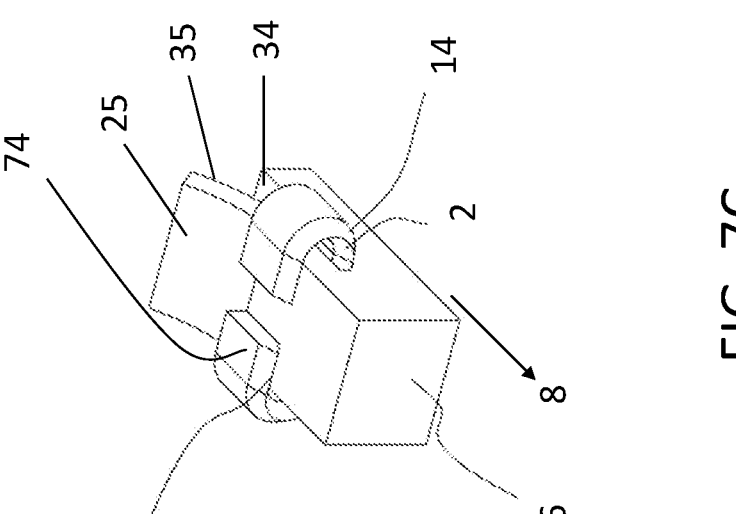
FIG. 7C is a perspective view of the curved stylus shown in FIGS. 7A and 7B engaged with a sample. The stylus is configured to perform a contact mechanics test and assist in maintaining appropriate alignment to the sample surface.
Figure 7B:
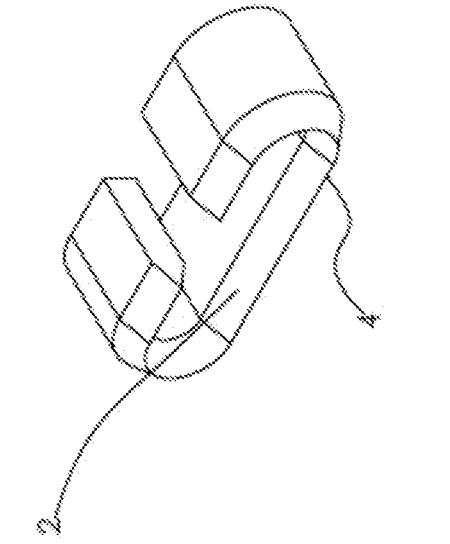
FIGS. 7A and 7B are schematics of front and isometric views, respectively, of a stylus geometry that is curved according to embodiments of the present invention.
Figure 7A:
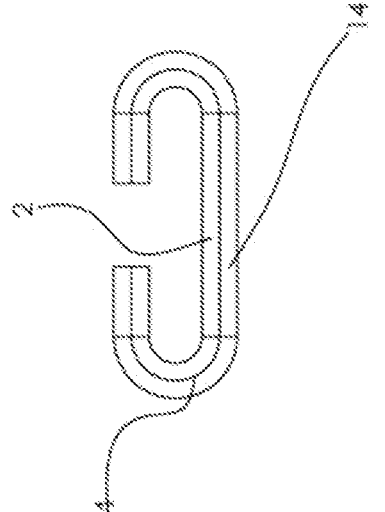

FIGS. 7A and 7B show a front view and perspective view, respectively, of a stylus 18 that is curved and FIG. 7C shows the stylus 18 engaged with the sample 16. For example, the stylus 18 may be c-shaped where the outer edges of the stylus 18 are curved away from the stretch passage 6 in the direction of the free surface of the sample 16. Curving the stylus 18 towards the free surface of the sample 16 may reduce the steps required for sample preparation. Additionally, a configuration where the stylus 18 is curved may allow the portion of the stylus 18 that curves towards the free surface to serve as a component of a sample reference system 74, a sample compression element 24 or a stylus steering system 90. The stylus 18 that is curved may reduce or eliminate the need for machining the sample 16 and may be manufactured from a solid block of material or formed from different components.

Figure 8:
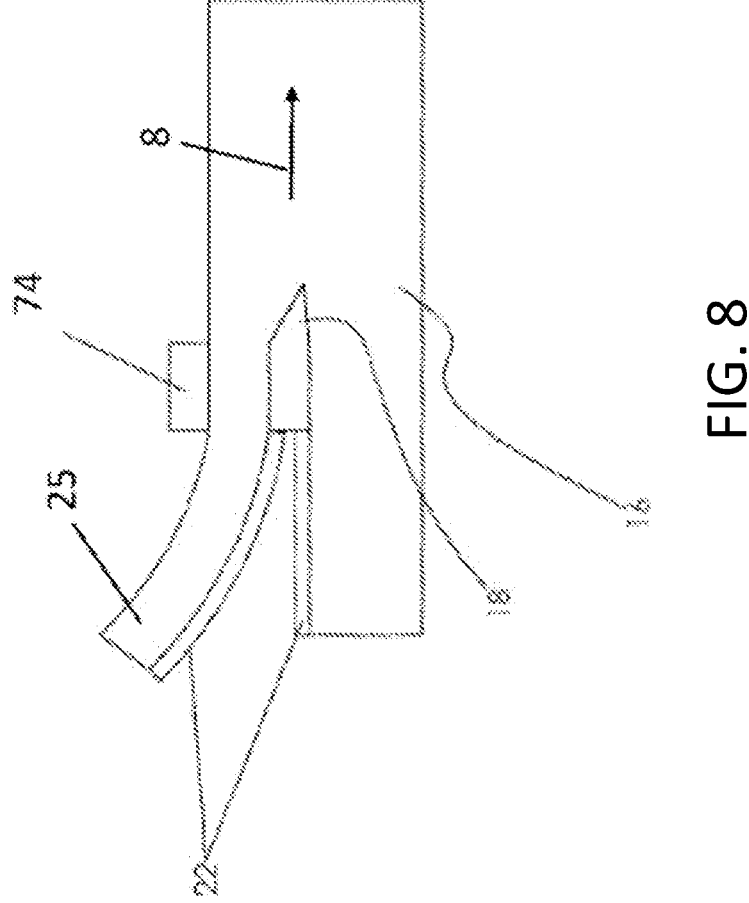
FIG. 8 is a schematic of a stylus with or coupled to a sample reference feature to maintain proper alignment of the stylus relative to the sample surface throughout the contact mechanics test according to embodiments of the present invention.
Figure 9:
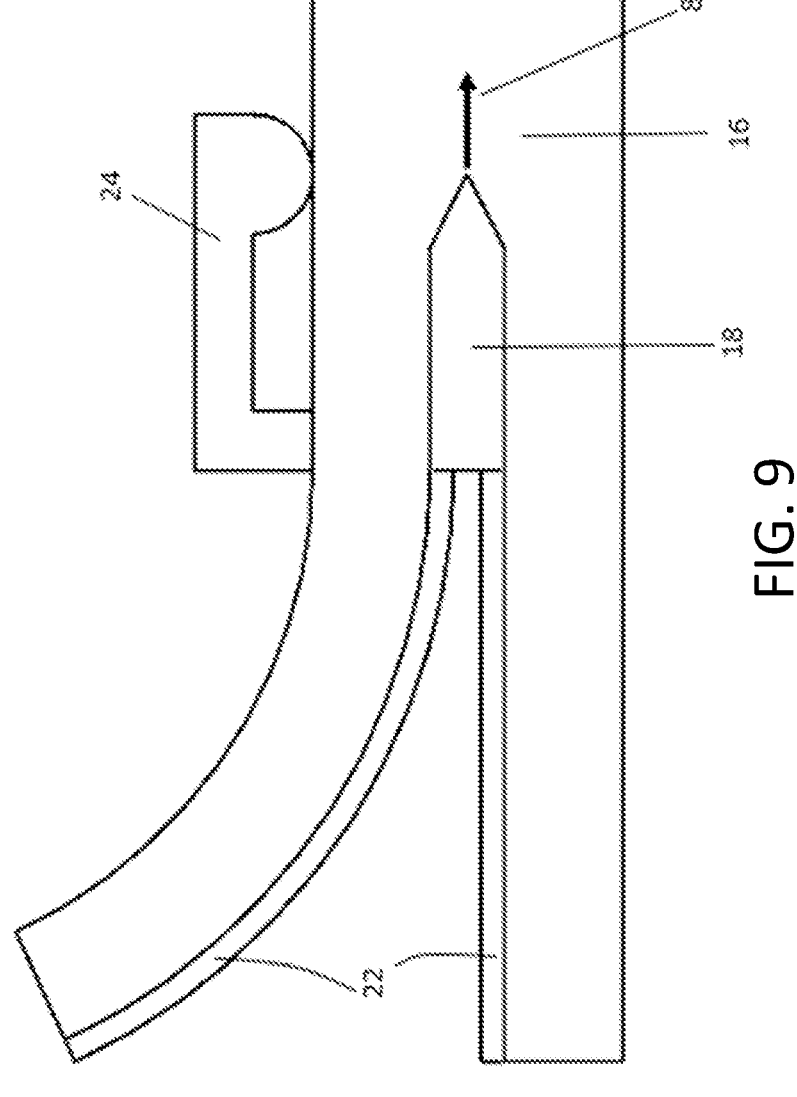
FIG. 9 is a schematic of a stylus with or coupled to a sample compression element configured to apply a compressive force to the sample surface to prevent fracture ahead of the cutting edges for low-toughness materials according to embodiments of the present invention.

FIGS. 8 and 9 show a stylus 18 engaged with a sample 16 during a contact mechanics test, showing the portions of the sample 16 behind the stylus 18 have a ligament 22. Additionally, the stylus 18 may include or be coupled to a sample compression element 24 that puts the sample in compression ahead of the cutting edge 4 to prevent premature fracture throughout the contact mechanics test, as shown in FIG. 9. Alternatively, or in addition, the stylus may include or be coupled to a sample reference system 74 configured to set a desired path trajectory, as shown in FIG. 8, and/or a stylus steering system 90 (not shown) configured to maintain a desired path trajectory. One component or system may serve as the sample compression element 24, the sample reference system 74 and/or the sample steering system 90.

Figure 11:
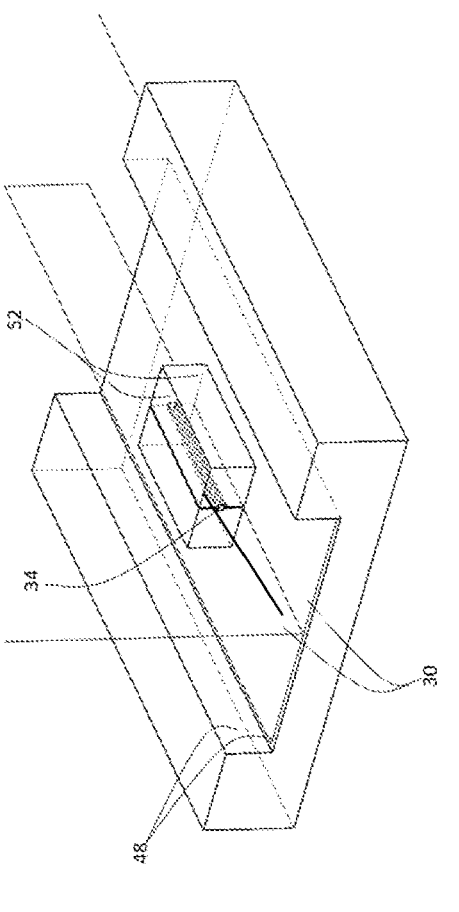
FIG. 11 shows the material response from the stylus in FIG. 10.
Figure 10:
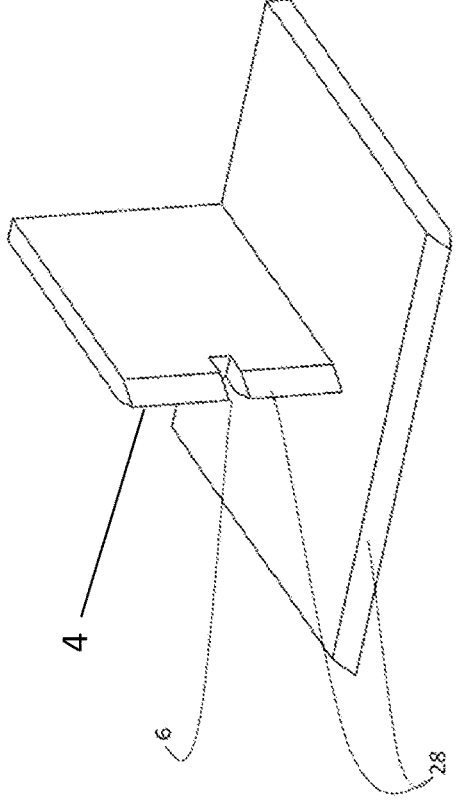
FIG. 10 is a schematic of an isometric view of a stylus with two cutting blades oriented vertically and a cutting blade oriented horizontally and perpendicular to the other cutting blades according to embodiments of the present invention. The horizontal cutting blade forms a free surface in the sample and the vertical cutting blades perform the contact mechanics test.

FIG. 10 shows a stylus 18 having two cutting blades 28 oriented vertically and a cutting blade 28 oriented horizontally and perpendicular to the other vertical cutting blades 28. The horizontal cutting blade 28 has a cutting edge 4 configured to be substantially parallel to the free surface of the sample 16 to separate a portion of the sample 16 from the bulk of the material. The two vertical cutting blades 28, with a stretch passage 6 between the cutting blades 28, perform the contact mechanics test when the stylus 18 moves along the path trajectory 8 and the cutting blades 28 deform the sample 16. FIG. 11 shows the material response in the sample 16 when the stylus 18 shown in FIG. 10 moves along the path trajectory. The sample 16 may first be prepared with a machined surface 48 which isolates a volume of material for interaction with the stylus 18. Two cutting surfaces 30 are shown in FIG. 11 to represent the cutting surface 30 formed by the horizontal cutting blade 28 and the cutting surface 30 formed by the vertical cutting blades 28. The surface oriented perpendicular to the free surface 52 shows a portion of the sample 16 with a residual sample surface 34 corresponding to the presence of a stretch passage 6 in the stylus 18.

Figure 13:
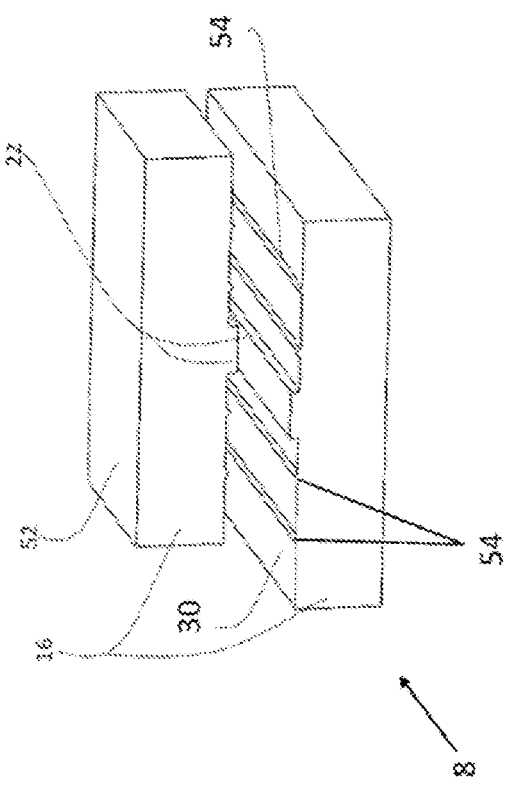
FIG. 13 depicts the material response in the sample from the stylus in FIG. 12.
Figure 12:
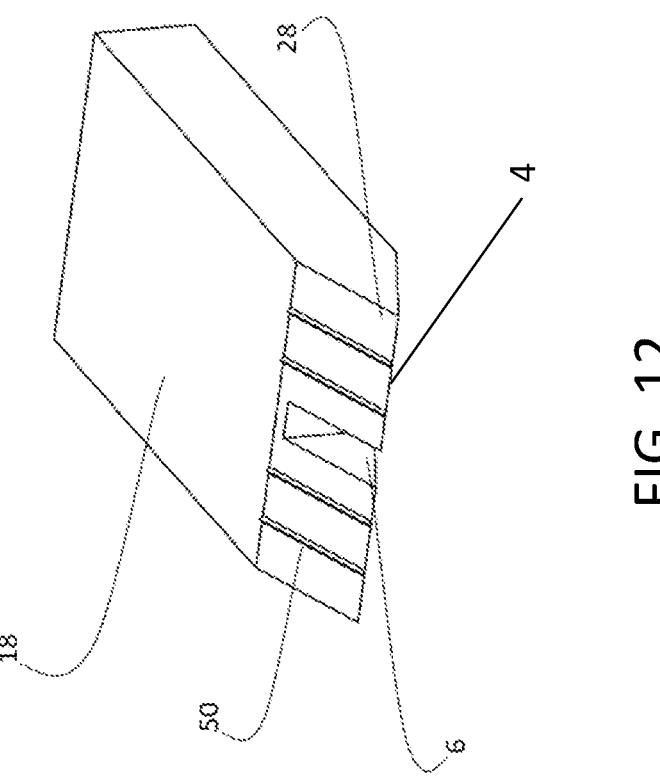
FIG. 12 is a schematic of a stylus with one or more flow-constraining passages on one or more cutting blades which limit movement perpendicular to the path trajectory of the stylus according to embodiments of the present invention.

FIG. 12 shows a stylus 18 with two cutting blades 28 having flow-constraining passages 50. Flow constraining passages 50 are designed to limit the plastic strain which occurs during a contact mechanics test which acts to pull material into the stretch passage 6. FIG. 13 shows the material response in the sample 16 when the stylus 18 shown in FIG. 12 moves along the path trajectory 8. The flow constraining passages 50 on the stylus 18 form corresponding flow constraining features 54 in the cutting surface 30 of the residual sample surface 34, during the contact mechanics test.

Figure 14A:
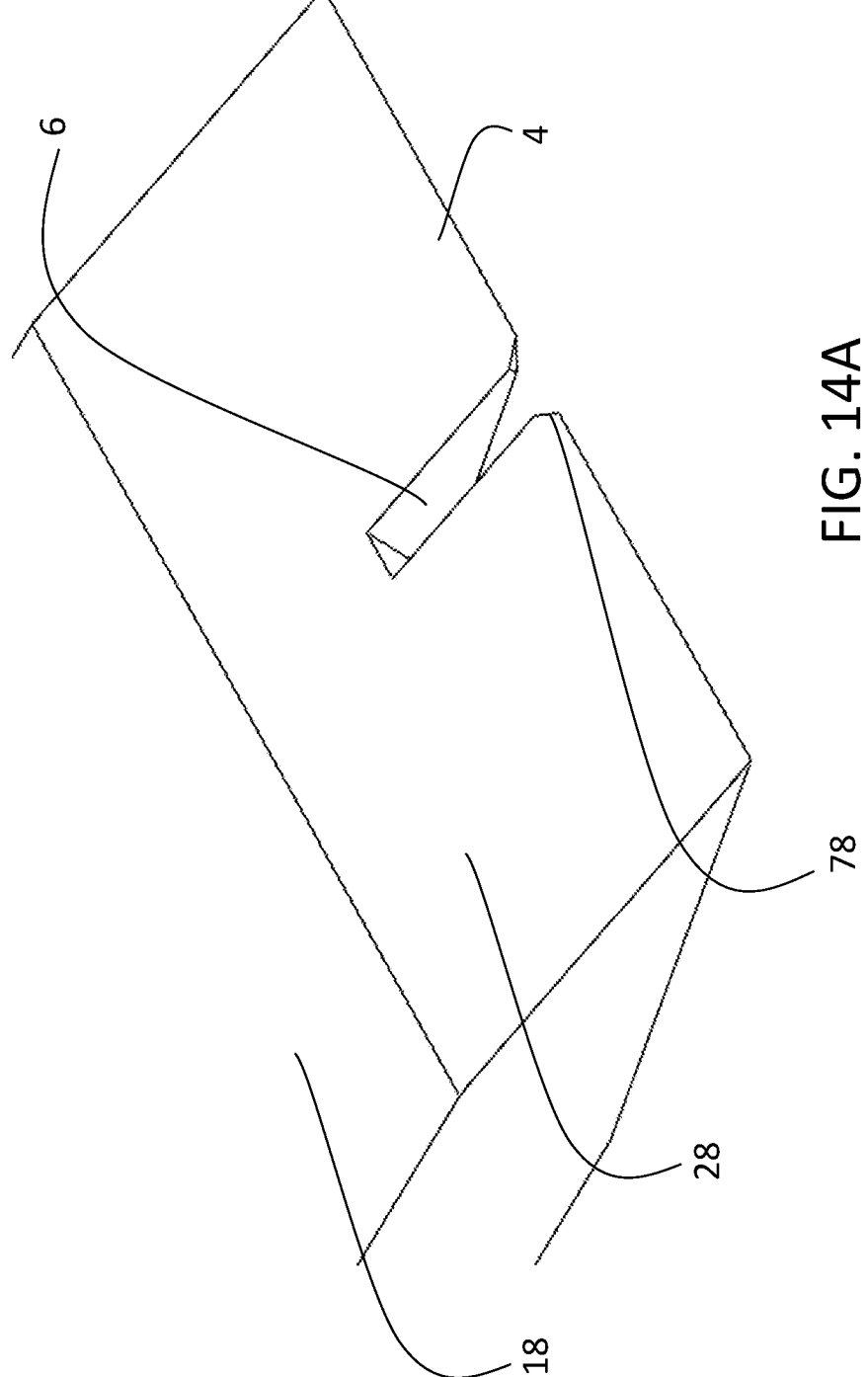
FIGS. 14A-14C show schematics of a stylus with blunting surfaces according to embodiments of the present invention.
Figure 14B:
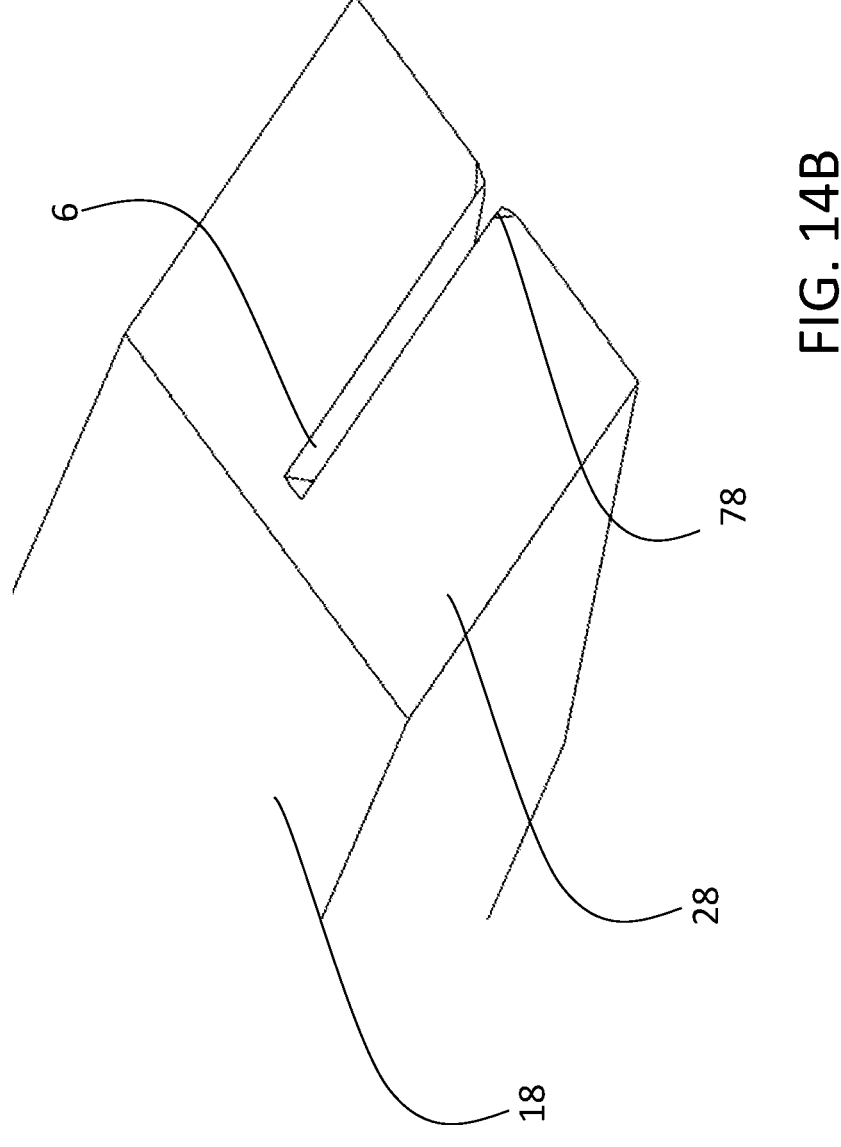
Figure 14C:
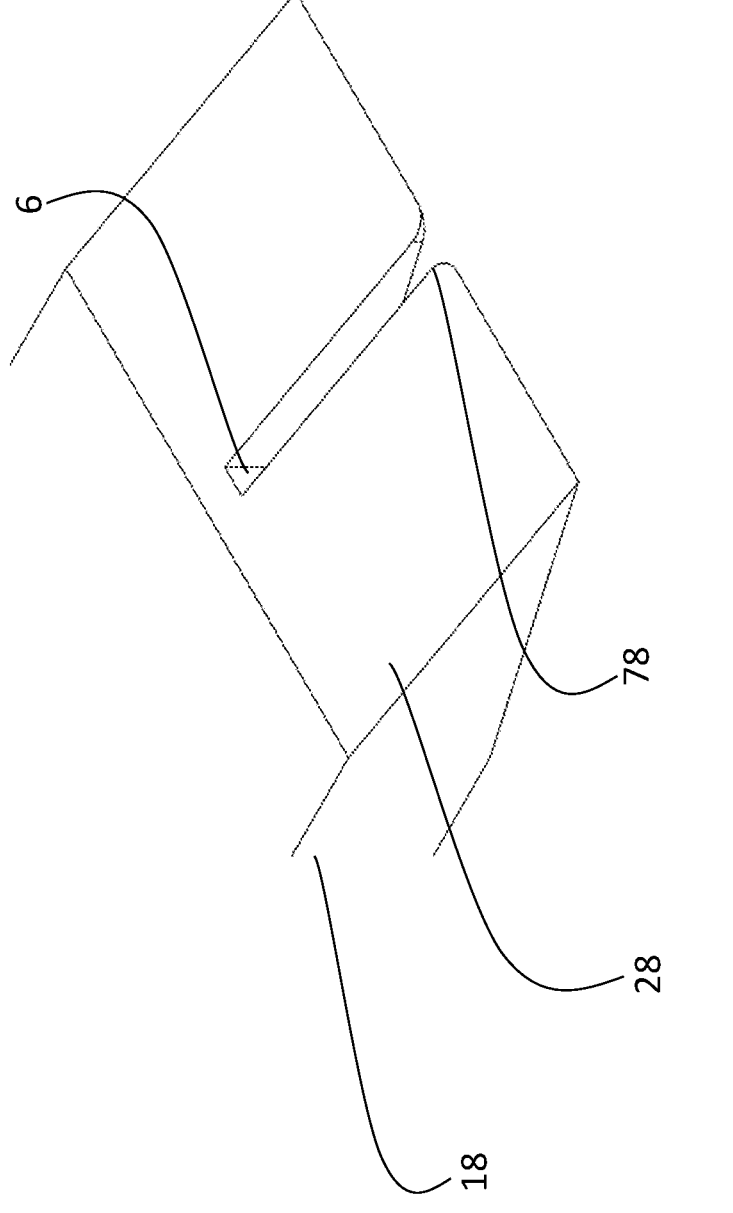

Cutting blades 28 with one or more profiles may be configured to relieve stress on the stylus 18 at one end of the cutting edge 4 adjacent to or facing the stretch passage 6 and/or along the cutting edge 4. For example, FIGS. 14A-14C show different blunting surfaces 78 that may be used at one end of the cutting edge 4 which may be configured akin to chamfers, fillets, and other more complex geometries. Blunting one end of the cutting edge 4 or along the cutting edge 4 allows stress at the cutting edge 4 to be reduced, reducing the likelihood of damaging the cutting blades 28 during a contact mechanics test.

Figure 15:
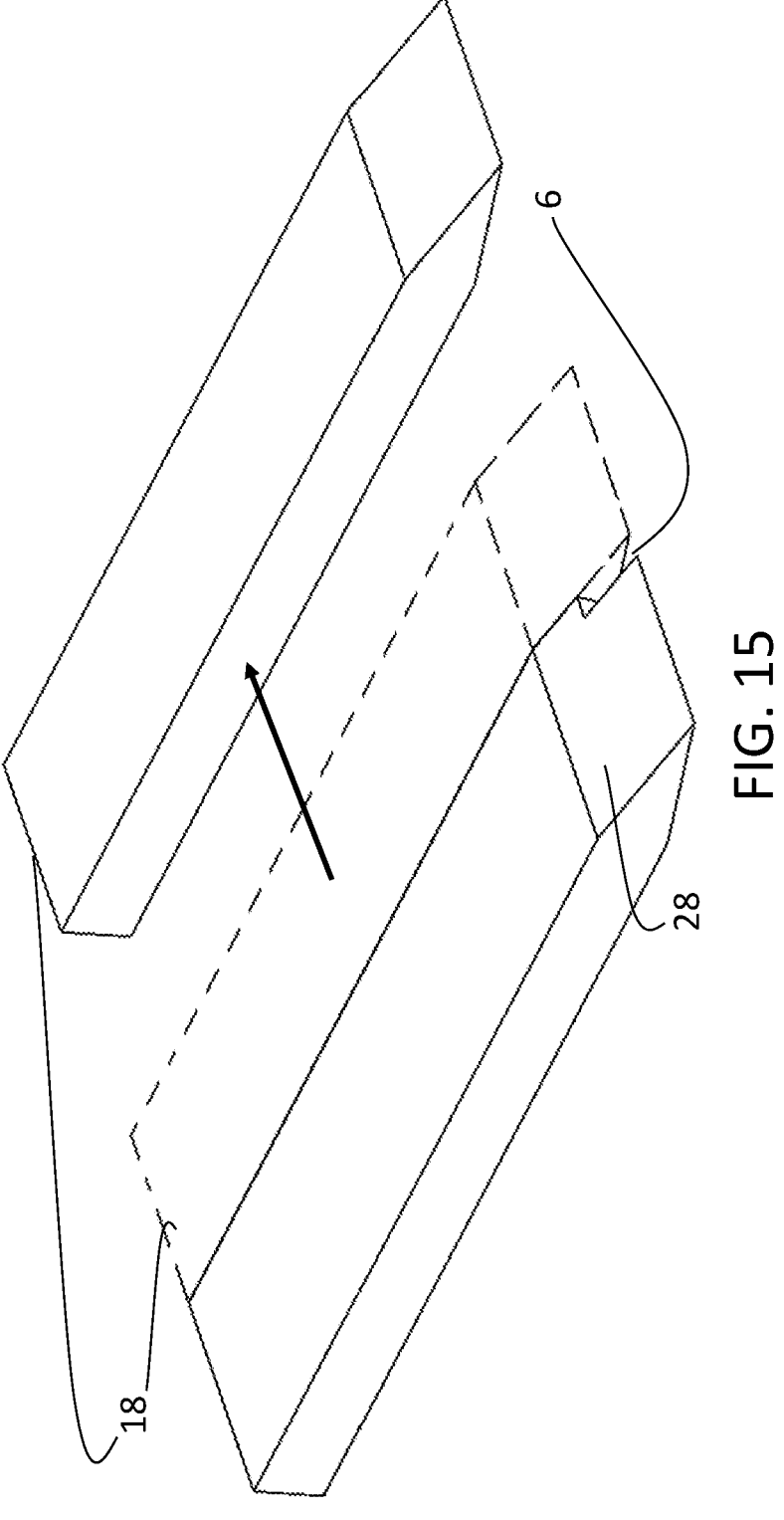
FIG. 15 is a schematic of a stylus configured to have one or more cutting blades that are removable according to embodiments of the present invention.

FIG. 15 shows an isometric view of a stylus 18 having two cutting blade 28 which may be individually removably detachable from the stylus 18 in order to allow direct observation of the region inside the stretch passage 6 during a contact mechanics test that has been paused for data collection.

Figure 16A:
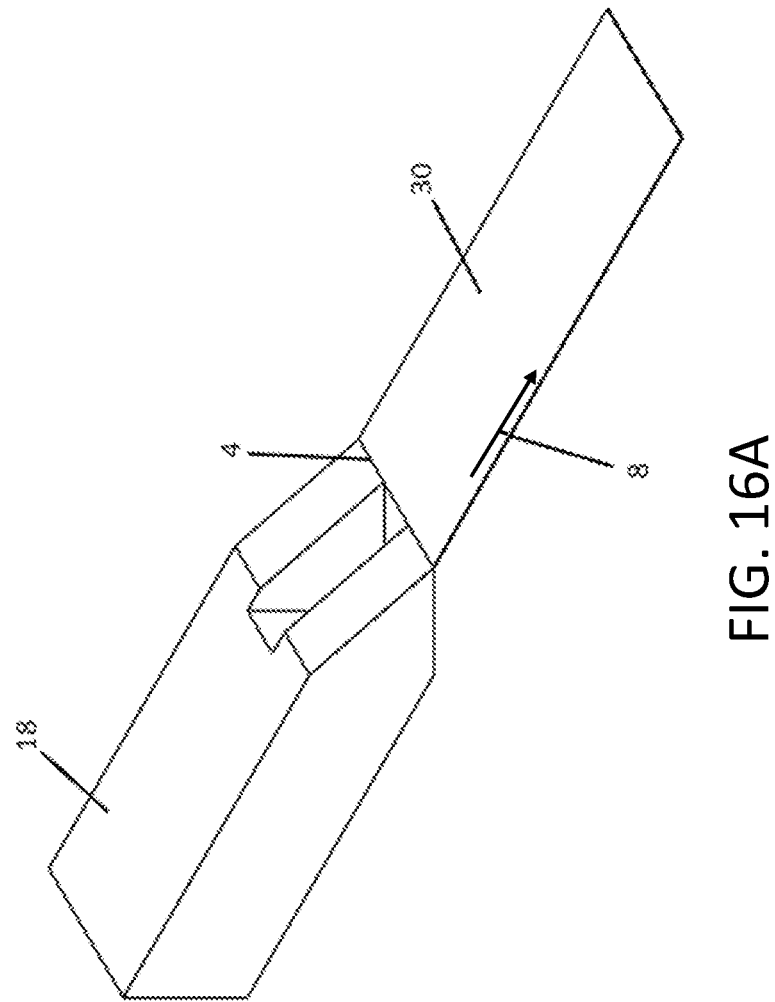
FIG. 16A is a schematic of an isometric view of a stylus depicting the cutting surface according to embodiments of the present invention. The cutting surface is defined by a cutting edge and the path trajectory.

FIG. 16A shows a stylus 18 having two cutting blades 28, each cutting blade 28 having a cutting edge 4 that forms a cutting surface 30 in the sample. The cutting surface 30 isformed by the path trajectory 8 and the cutting edge 4. The cutting surface 30 remains fixed with respect to the sample 16 and relatively planar if the path trajectory 8 is straight. For nonlinear path trajectories, the cutting surface 30 changes orientation during a contact mechanics test.

Figure 16B:
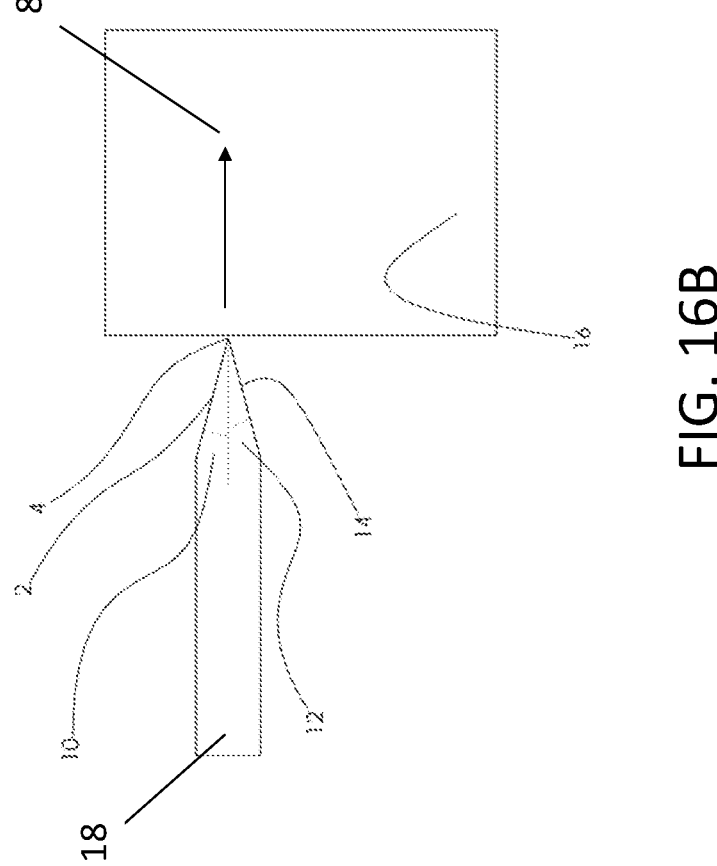
FIGS. 16B and 16C are schematics of a stylus and different path trajectories into the sample according to embodiments of the present invention.
Figure 16C:
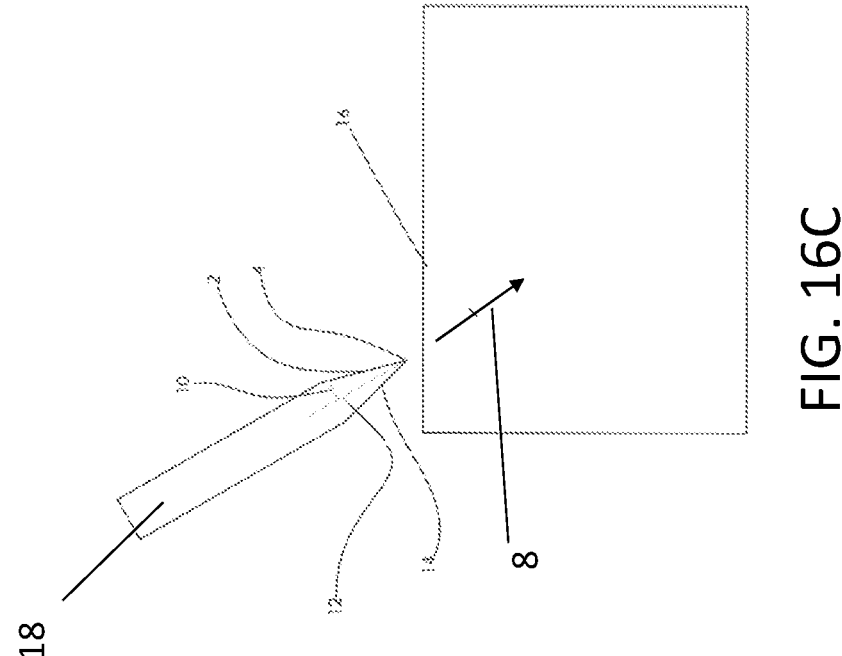

FIGS. 16B and 16C show a stylus 18 and different path trajectories into the sample 16. The path trajectory 8 may be controlled through manipulation of the dive angle 10 and lift angle 12 and/or by the stylus steering system 90. When the dive angle 10 and lift angle 12 are equal in magnitude, as measured from the stylus reference line 26, the stylus prefers to travel in a straight path trajectory 8, provided the material of the sample 16 is approximately isotropic and homogeneous and the path trajectory 8 provides sufficient sample 16 material on both the blade dive surface 2 and blade lift surface 14. If the dive angle 10 is greater than the lift angle 12, the stylus 8 prefers to increase its penetration depth into the sample 16 as the contact mechanics test progresses. If the lift angle 12 is greater than the dive angle 10, the stylus 8 prefers to lift to the sample surface as the contact mechanics test progresses.

Figure 16D:
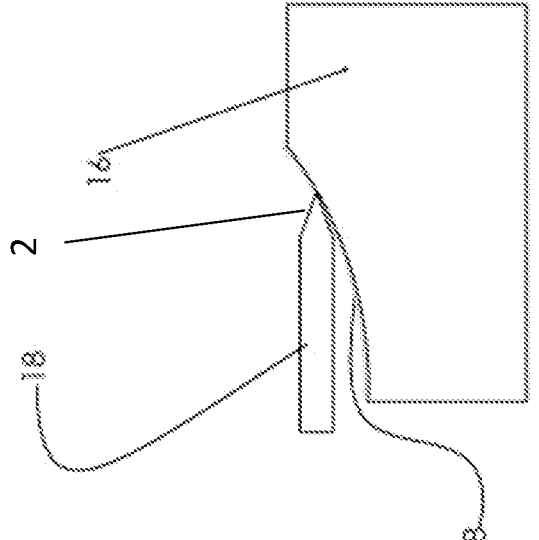
FIG. 16D is a schematic of a stylus with a curved path trajectory according to embodiments of the present invention.

FIG. 16D depicts a stylus 18 traveling in a curved path trajectory 8. The contact mechanics test may be conducted near the surface of a thick sample 16 and the stylus 18 path trajectory 8 may move to the sample 16 surface due to the low force on the blade dive surface 2 from the shallow test depth. A nonlinear path trajectory 8 that moves closer to the sample 16 surface may be preferential in some cases to prevent sample 16 or stylus 18 damage.

Figure 17:
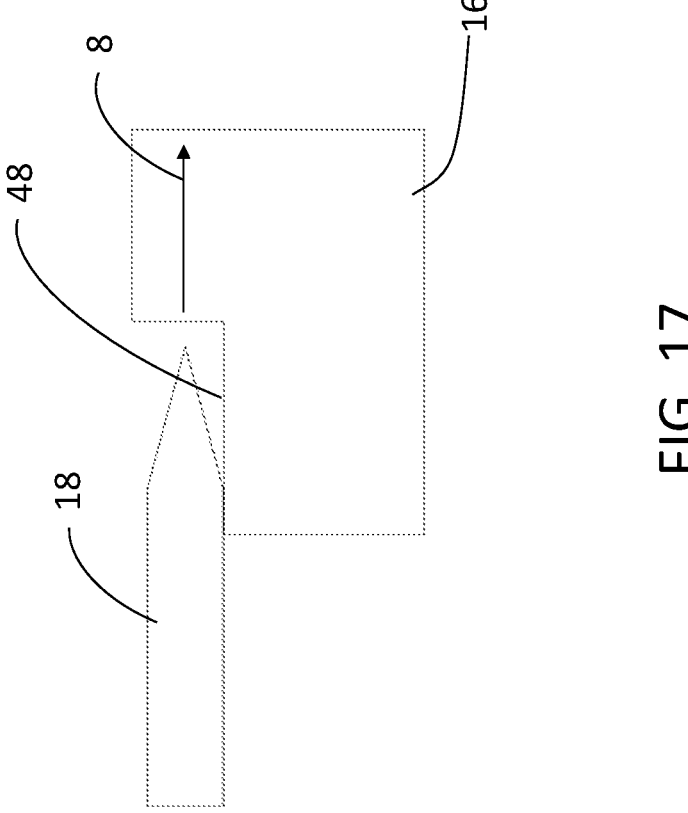
FIGS. 17-21 are schematics of styluses engaging samples that have been prepared with machined surfaces, machined sampling area surfaces or features to guide the stylus, the path trajectory, or both according to embodiments of the present invention.

FIG. 17 depicts a sample 16 prepared with a machined surface 48. A flat machined surface 48 may be formed in the sample 16 surface, e.g., to set the test depth and guide the stylus 18 through a straight path trajectory 8 substantially parallel to the sample 16 surface. Machined surfaces 48 may generally be used to allow the stylus 18 to engage the sample 16, direct the path trajectory 8, reduce the amount of material that the stylus 18 contacts for the purpose of reducing stylus 18 wear or damage or removing material that may interfere with the stylus 18 or other components of the material toughness testing apparatus.

Figure 18B:
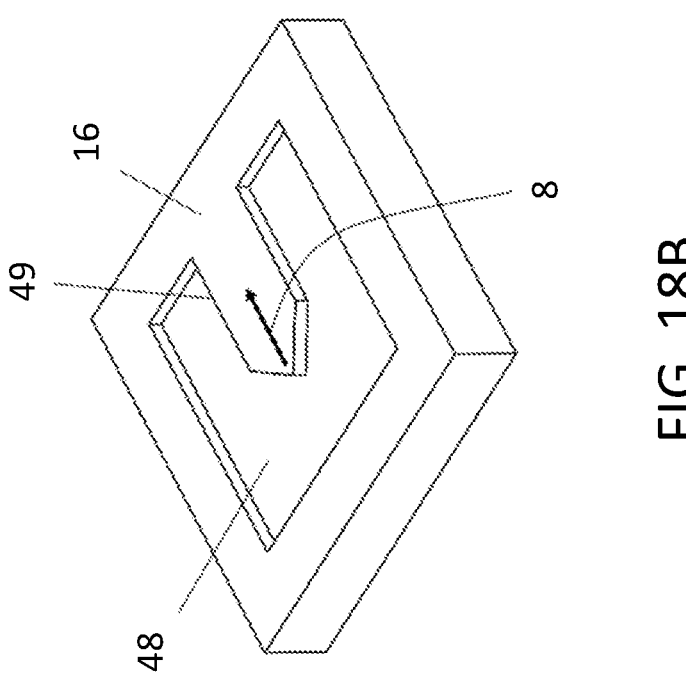
Figure 18A:
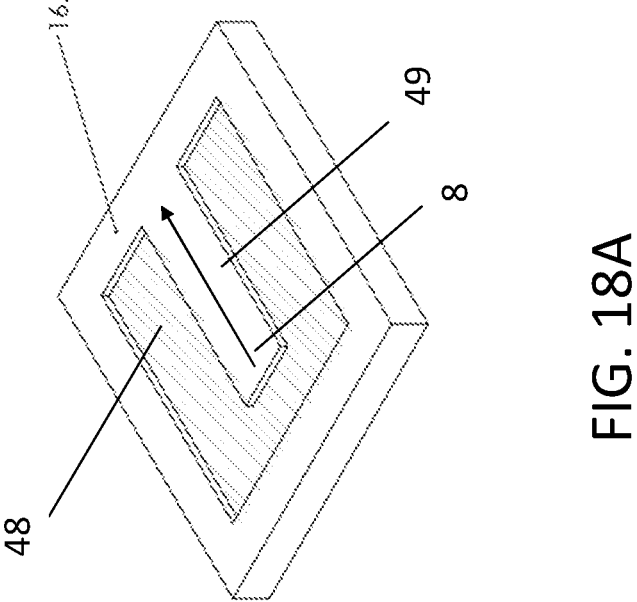
Figure 19:
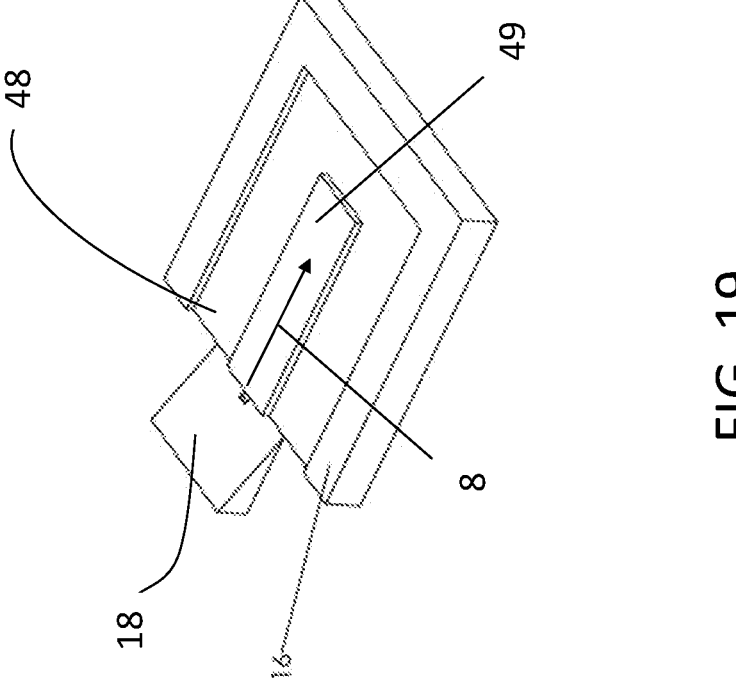
Figure 20:
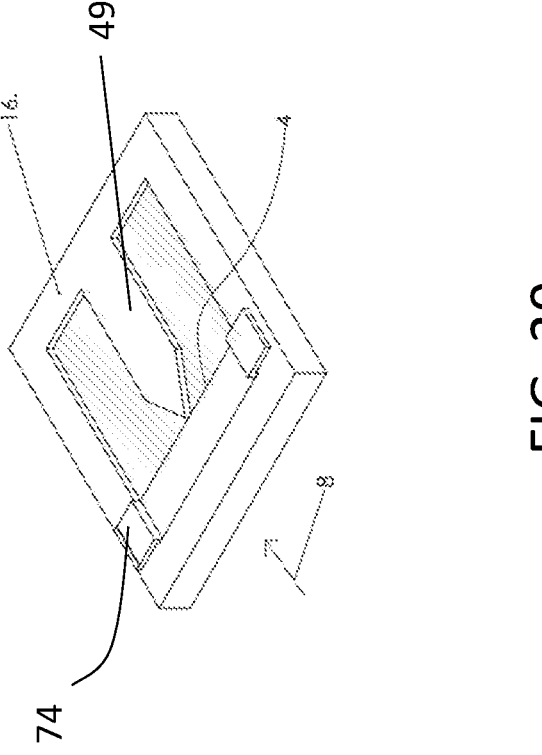

FIGS. 18A and 18B show a test structure formed in a surface of the sample 16. The test structure includes a machined surface 48 formed in a surface of the sample 16 and a test sample 49 configured to engage with the at least two cutting blades 28 during the contact mechanics test. The test structure may be formed with any shape. For example, the test structure may have a U-shape, such as shown in FIGS. 18A and 18B, or have an O-shape, such as shown in FIG. 11. The test structure may be prepared for a specific stylus 18 geometry. The machined surface 48 creates the test sample 49 in the surface of the sample 18 to be tested and a vertical surface of the test sample 49 allows the cutting edges 4 of the cutting blades 28 to engage the test sample 49. The test sample 49 may be rectangular in shape, as shown in FIG. 18A, or may have a v-shaped edge, as shown in FIG. 18B, which forms a sharp entry point for the stylus 18, allowing the stresses subject to the stylus 18 to increase gradually and potentially reducing the risk of cutting blade 28 damage or wear. As shown in FIG. 19, the stylus 18 may be wider than the test sample 49 so that a portion of the cutting edges 4 does not make contact with the sample 16, reducing the amount of stylus 18 wear and the stress subjected to the stylus 18. As shown in FIG. 20, the machined surface 48 may provide a reference surface for the stylus 18 to allow a constant path trajectory 8. The stylus 18 may include or be coupled to a sample reference system 74 and configured to maintain a set depth or orientation of the cutting blades 28 relative to the surface of the sample 16 as the stylus 18 is moved along the sample 16 surface.

Figure 21:
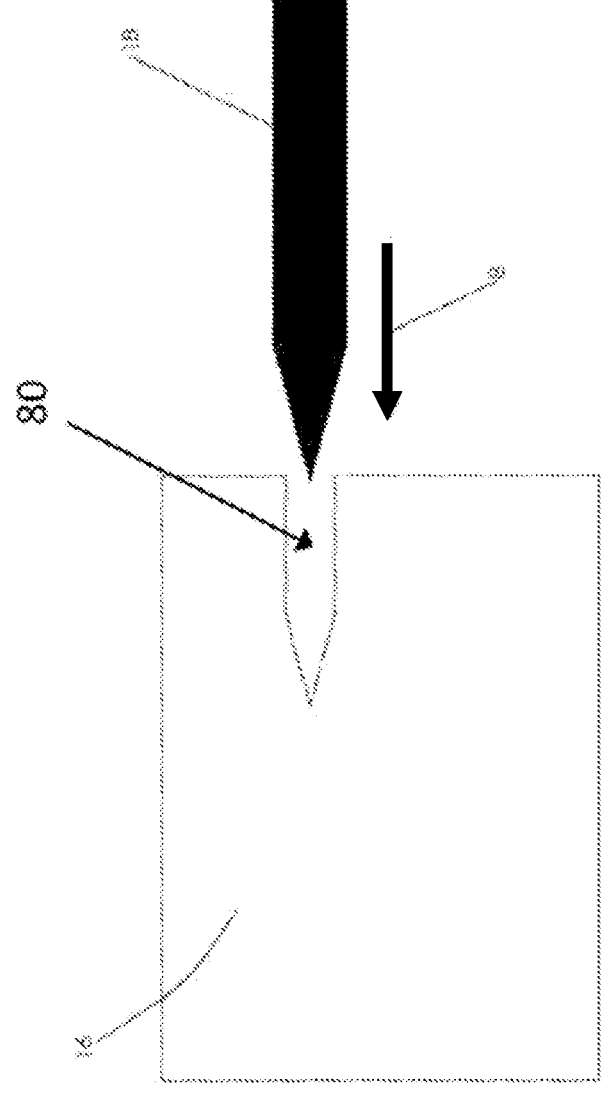

FIG. 21 shows a stylus 18 just before engagement with the sample 16 that has a pre-machined feature 80 that is under-sized compared to the stylus 18 and cutting blades 28. An undersized pre-machined feature 80 encourages the sample 16 to form a chip 25 sooner than if the pre-machined feature 80 was the same size as the stylus 18 or greater or if there was no pre-machined feature 80 at all.

Figure 22:
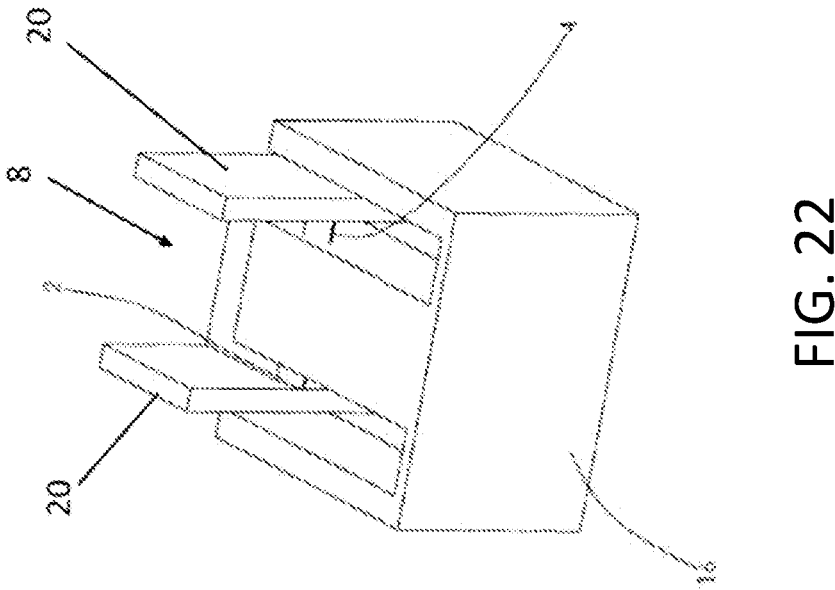
FIG. 22 is a schematic of a stylus with or couple to lateral supports engaging with a sample according to embodiments of the present invention.

FIG. 22 shows a stylus 18 with or coupled to one or more lateral supports 20 and having horizontal cutting blades 28.

Figure 23A:
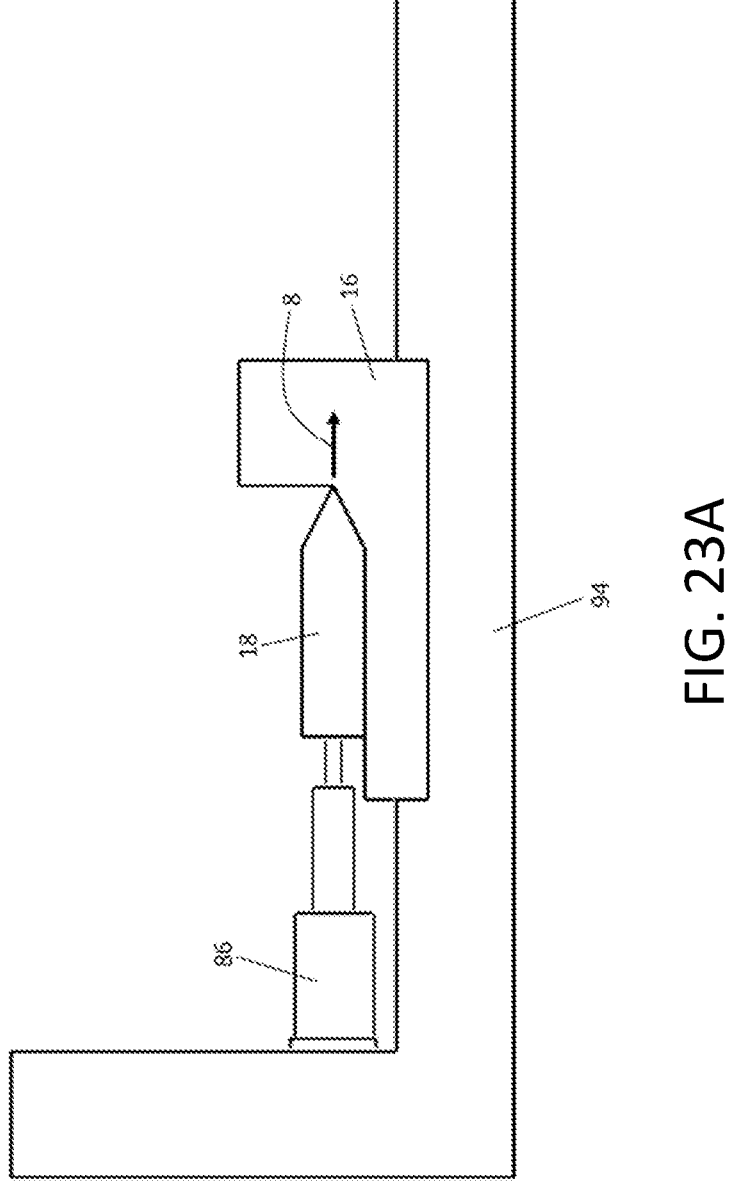
FIGS. 23A and 23B are a schematic side view and perspective view, respectively, of a material toughness testing apparatus having a linear actuator directly driving a stylus through a straight path trajectory according to embodiments of the present invention.

FIGS. 23A-28 show schematics of a material toughness testing apparatus having a stylus transport system 84 con-figured with one or multiple components to guide a stylus 18 through a contact mechanics test. FIG. 23A shows the apparatus positioned on a sample 16 surface and supported by a test support structure 94. FIGS. 23B and 24-28 show the apparatus without the test support structure 94 in order to readily see the various components.

Figure 23B:
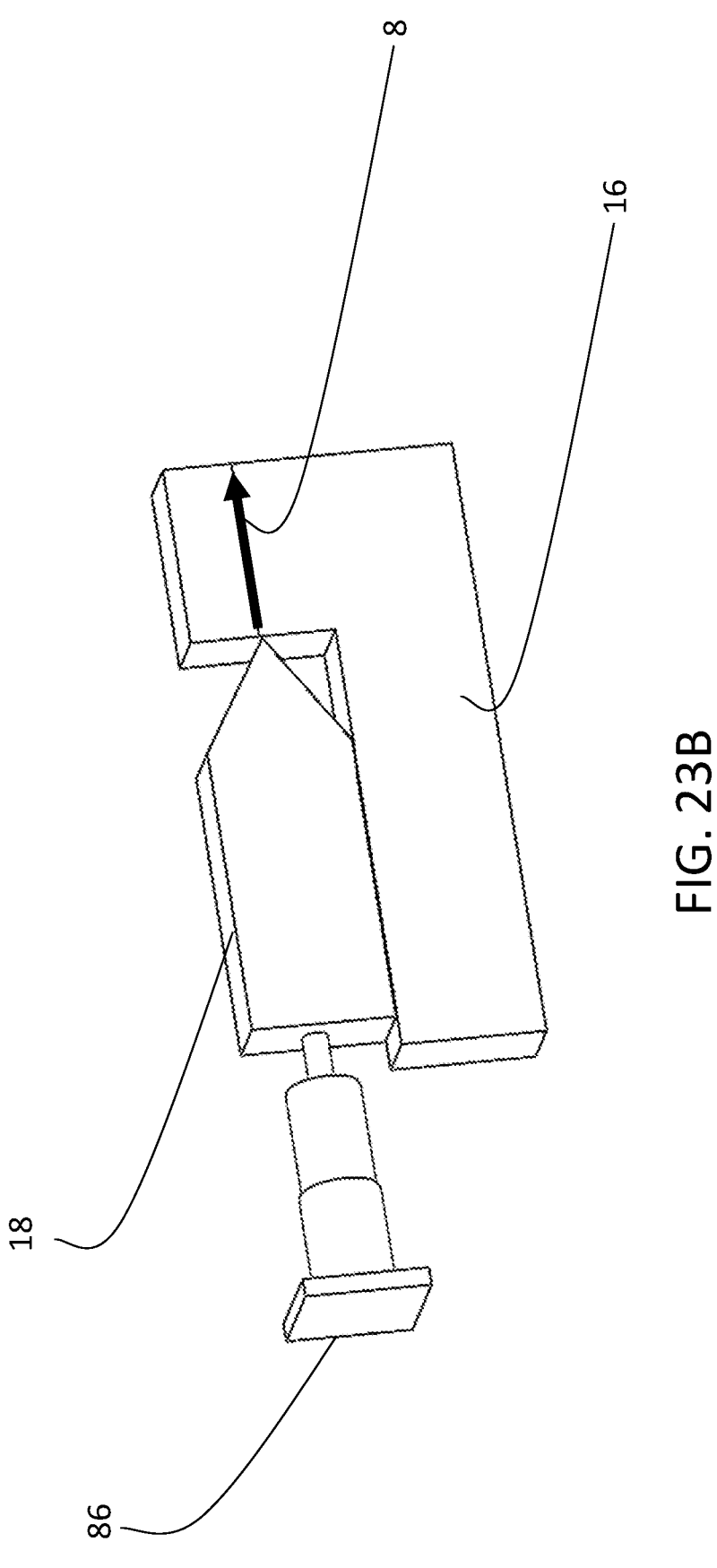

FIGS. 23A and 23B show a schematic of a stylus transport system 84 having an actuator 86 configured to directly drive a stylus 18 through a straight path trajectory 8. The actuator 86 may provide linear or non-linear motion to the stylus 18. The stylus 18 orientation may be controlled by contact with a machined surface 48 and moved by a linear actuator 86, setting and maintaining the depth of the contact mechanics test with respect to the sample 16 surface.

Figure 24:
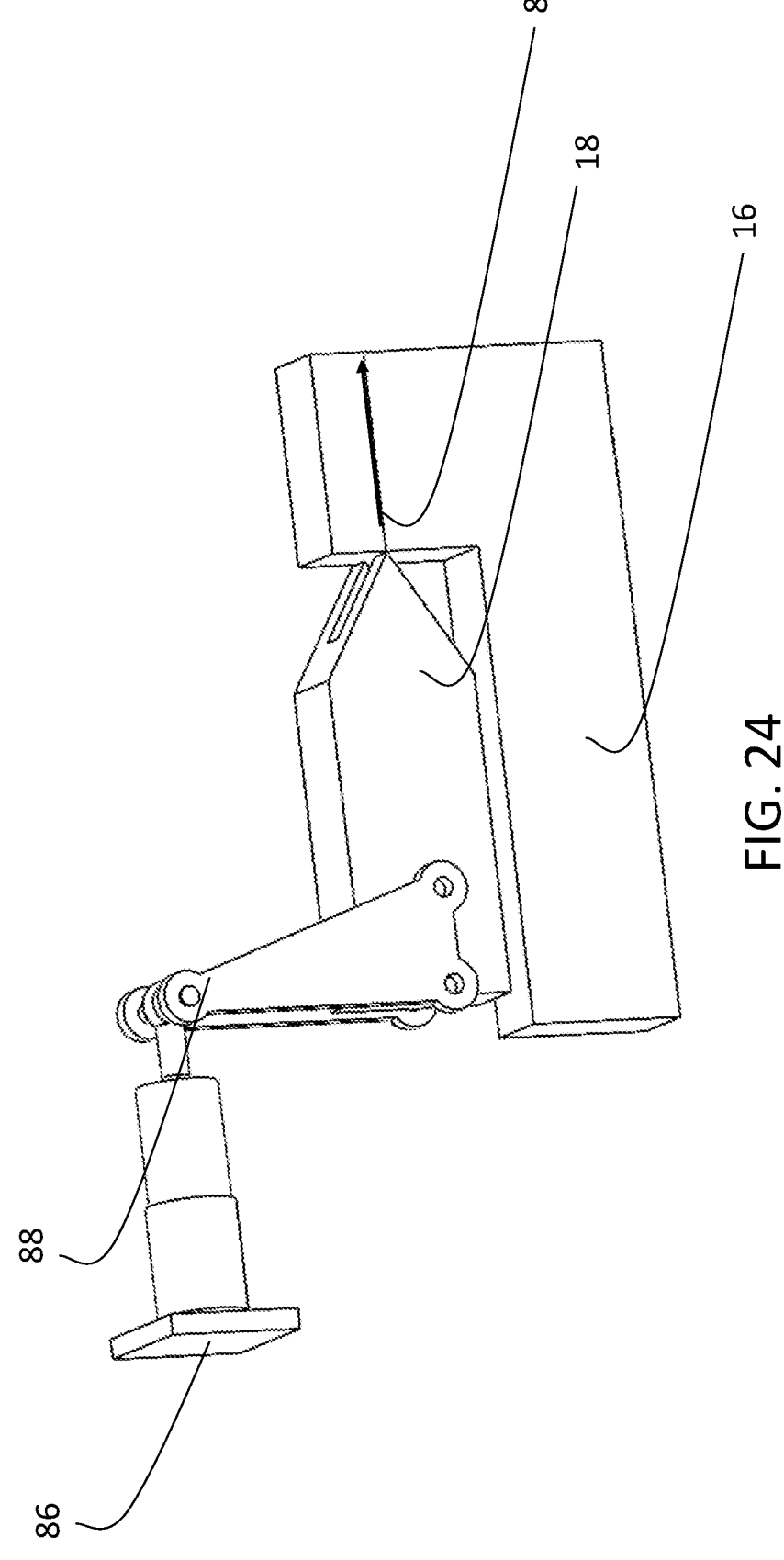
FIG. 24 shows a schematic of a linear actuator driving a stylus through a displacement transfer assembly according to embodiments of the present invention.

FIG. 24 shows a stylus transport system 84 with an actuator 86 configured to indirectly drive a stylus 18 via a displacement transfer assembly 88. The displacement trans-fer assembly 88 allows the magnitude and/or direction of the actuator 86 motion to be altered prior to being supplied to the stylus 18. For example, the actuator 86 motion may be increased by a lever-type displacement transfer assembly 88. The displacement transfer assembly 88 may also allow the actuator 86 to be placed away from the stylus 18 if the sample 16 geometry or other system components interfere with a more direct and adjacent actuator 86 placement.

Figure 25:
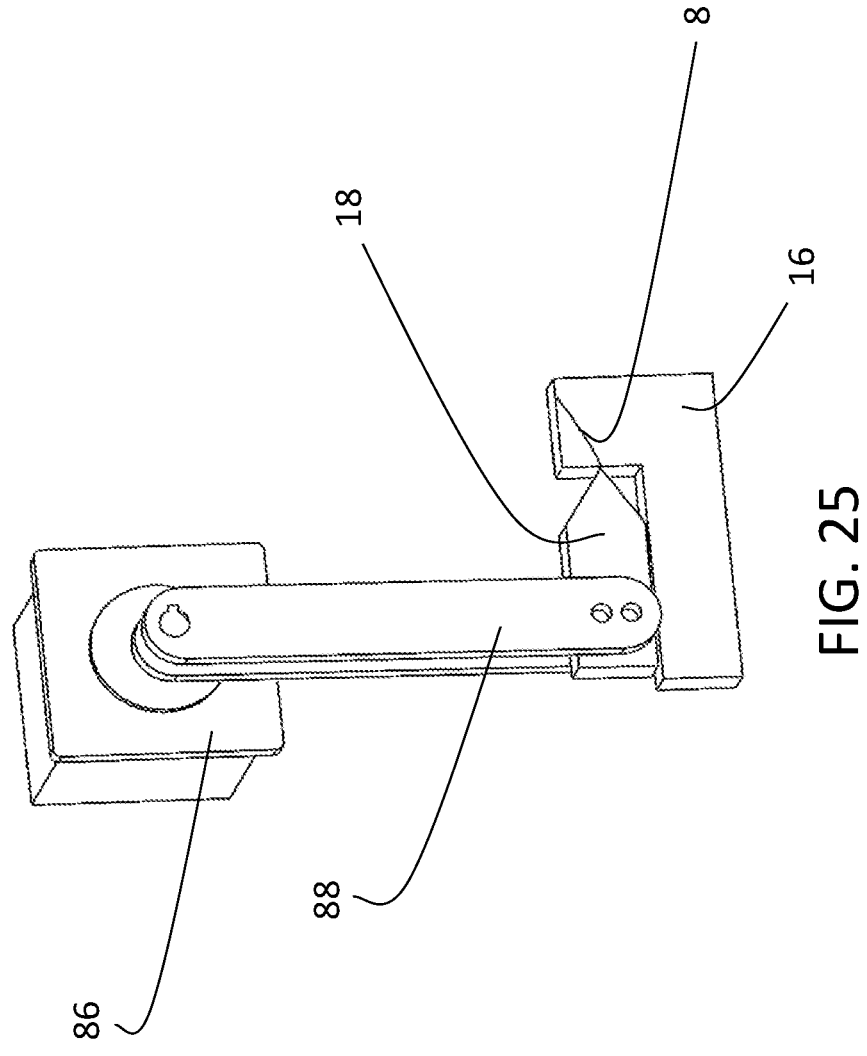
FIG. 25 shows a schematic in which a stylus is configured to engage a sample via a displacement transfer assembly and move through a curved trajectory according to embodiments of the present invention.

FIG. 25 shows a schematic of a stylus transport system 84 with an actuator 86 configured to indirectly drive a stylus 18 via a displacement transfer assembly 88 through a non-linear path trajectory 8. The displacement transfer assembly 88 is configured as a pendulum to drive the stylus 18 through a circular path trajectory 8.

Figure 26:
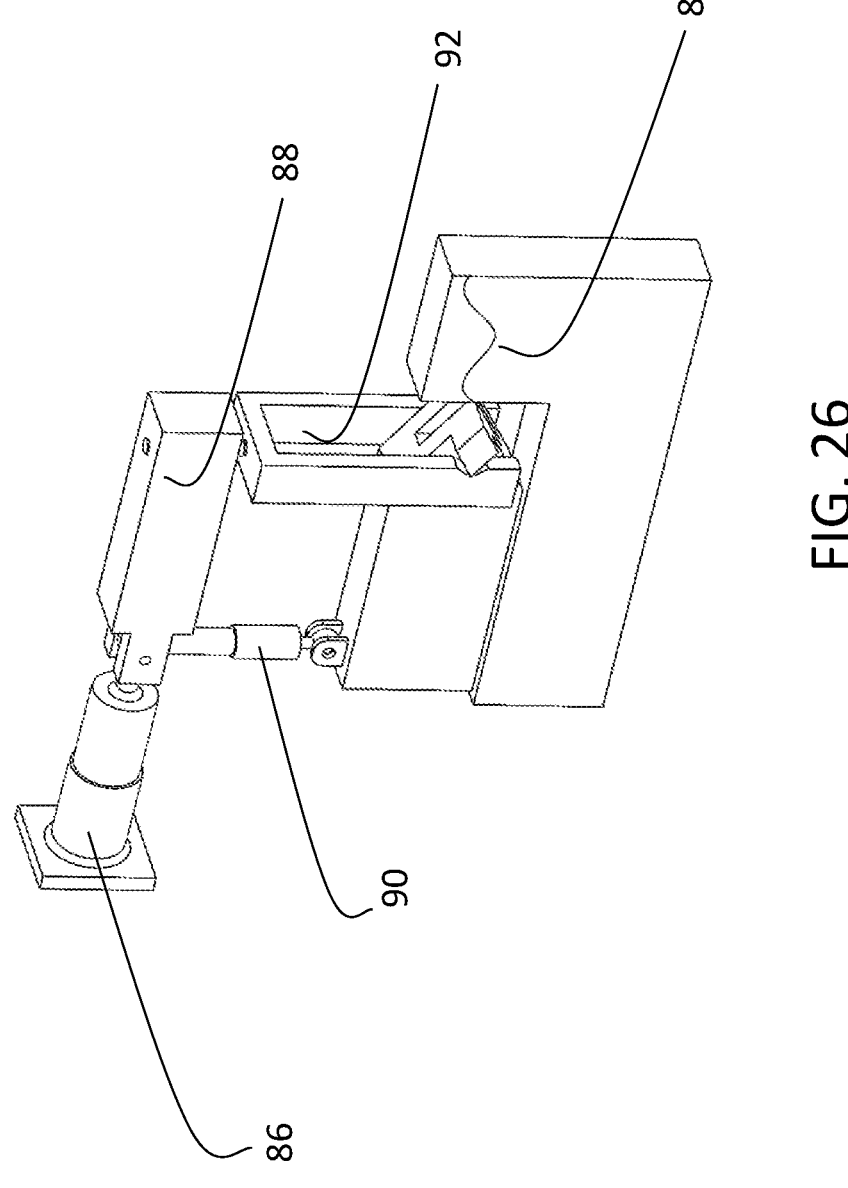
FIG. 26 shows a schematic of a stylus engaging a sample utilizing an actuator, displacement transfer assembly, and a stylus steering system with a pivoting mechanism to allow an irregular path trajectory according to embodiments of the present invention.

FIG. 26 shows a schematic of a stylus transport system 84 configured to drive a stylus 18 through an irregular path trajectory 8. An actuator 86 transmits motion to a displace-ment transfer assembly 88 which supplies forward motion to the stylus 18. The irregular path trajectory 8 of the stylus 18 is controlled via a stylus steering system 90 which moves the rear of the stylus 18 vertically while the front of the stylus 18 pivots through a pivoting mechanism 92, allowing the stylus 18 to be steered through a custom path trajectory 8.

Figure 27:
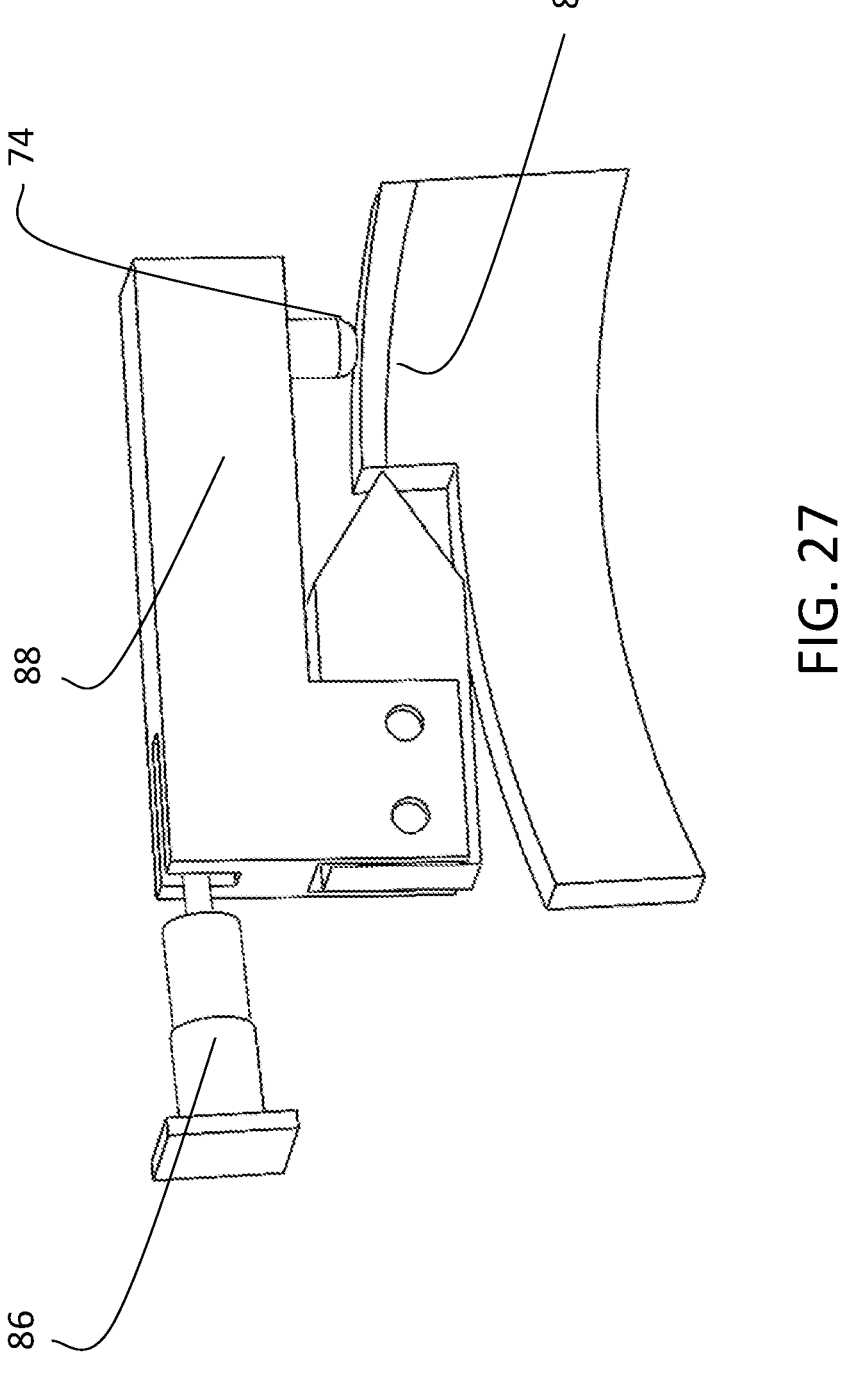
FIG. 27 is a schematic of a contact mechanics test in which the steering system is configured to conform to and follow the sample surface geometry and provide a fixed-depth test for irregular sample surface geometries according to embodiments of the present invention.

FIG. 27 shows a schematic of a stylus transport system 84. A stylus 18 engages a sample 16 via a sample reference system 74. The sample reference system 74 supplies the stylus 18 with a constant reference to the sample 16 surface, setting and maintaining a constant depth of the contact mechanics test with respect to the sample 16 surface for linear and non-linear sample surfaces.

Figure 28:
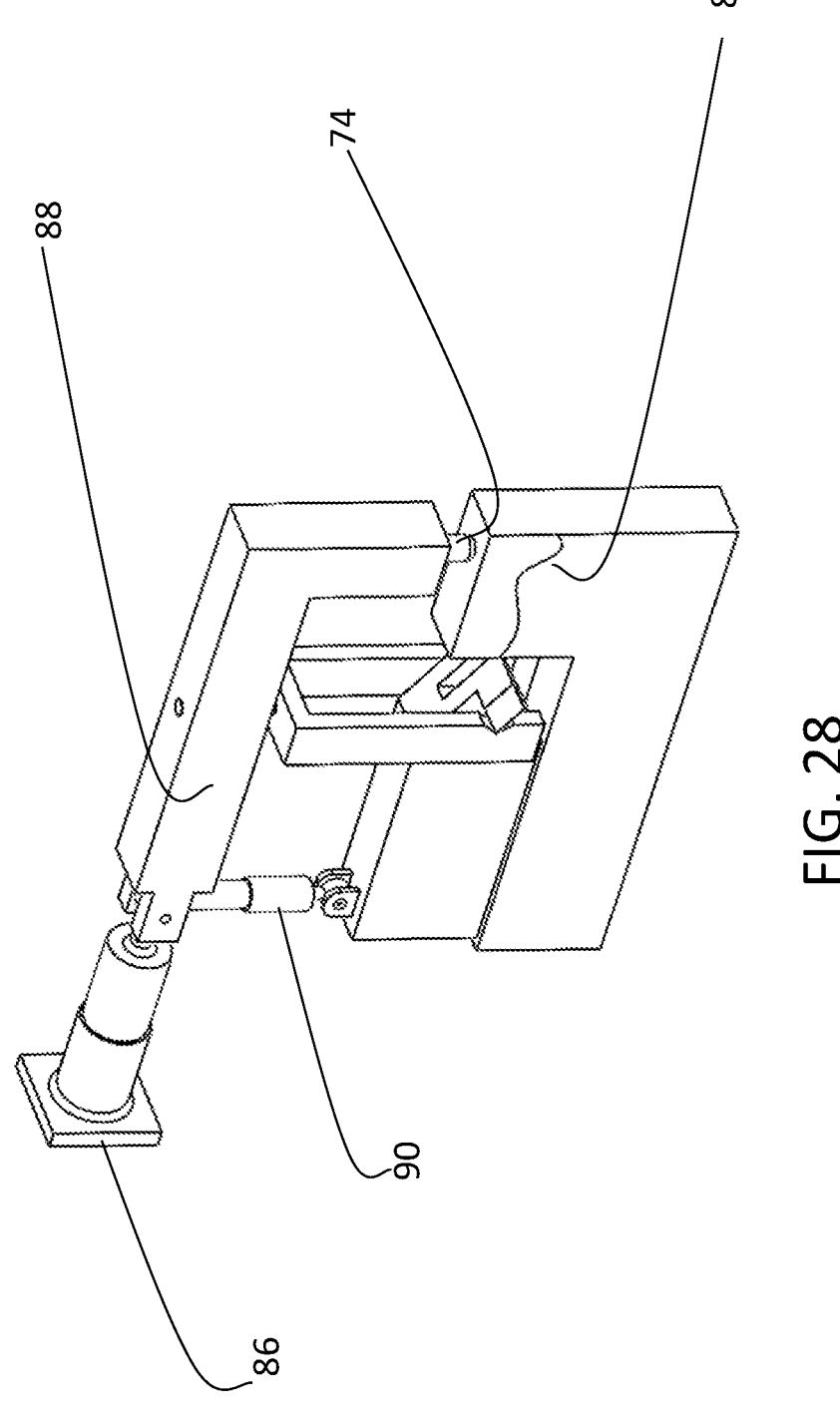
FIG. 28 shows a schematic of a stylus engaging a sample utilizing an actuator, displacement transfer assembly, stylus steering system with a pivoting mechanism, and a sample reference system to allow an irregular path trajectory relative to the surface of the sample according to embodiments of the present invention.

FIG. 28 shows a schematic of a stylus transport system 84. An actuator 86 is configured to drive a displacement transfer assembly 88 equipped with a sample reference system 74 which maintains constant contact with the sample 16 during the contact mechanics test. The stylus steering system 90 steers the stylus 18 with respect to the sample 16 surface referenced by the sample reference system 74. This enables the stylus 18 to take a non-linear path trajectory 8 with respect to the sample 16 surface or any other sample geometry referenced by the sample reference system 74.

Figure 29:
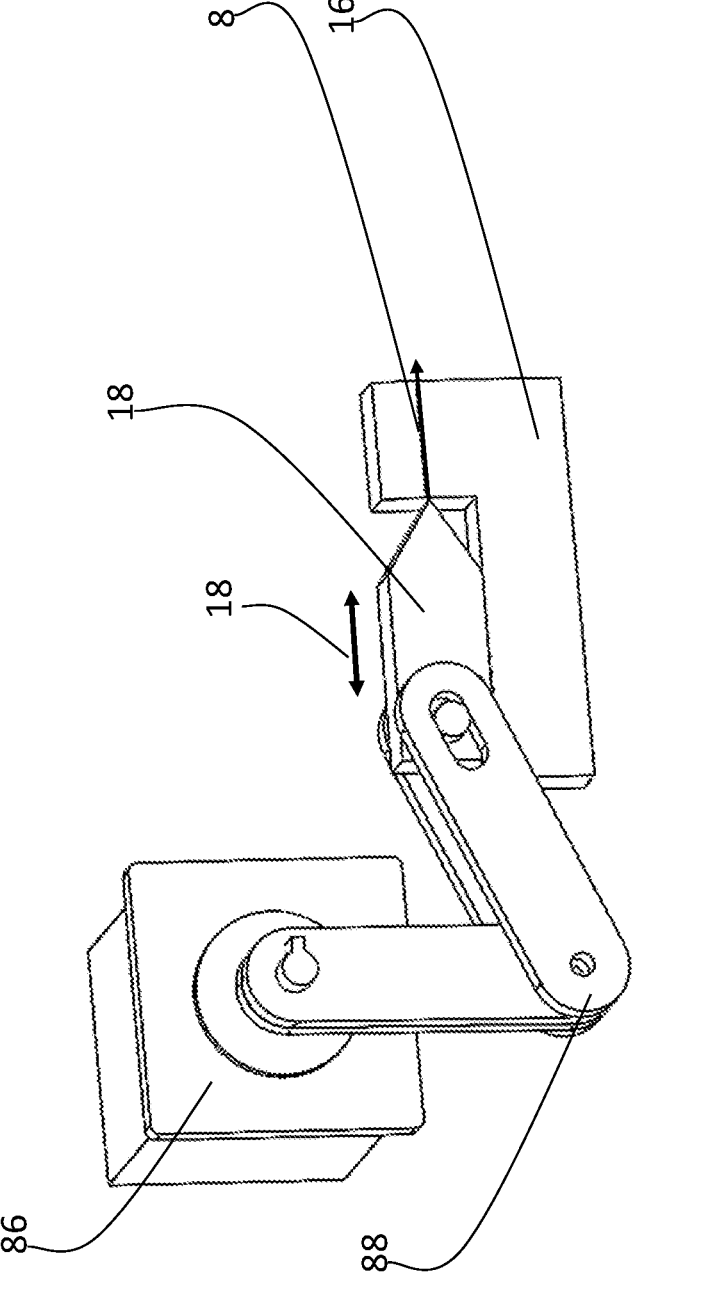
FIG. 29 is a schematic of a perspective view of a system attached to a stylus engaging the sample in a cyclic manner to prepare the sample surface for a contact mechanics test according to embodiments of the present invention.

FIG. 29 shows a schematic of a stylus transport system 84 configured with an actuator 86 providing rotational motion to a displacement transfer assembly 88 and to the stylus 18 allowing the stylus 18 to move cyclically. The stylus 18 orientation may be controlled by contact with a machined surface 48 which sets and maintains a constant depth of the contact mechanics test with respect to the sample 16 surface.

The contact mechanics test results in a residual sample surface 34 with various characteristics of interest. FIGS. 30 and 31A-31D show various possible micromodifications 42 which emerge within the stretch passage 6 as a ligament 22 develops, fractures, then propagates the fracture along the path trajectory 8 as the contact mechanics test continues.

The contact mechanics test may be paused to observe these features and collect data. The temperature of the sample 16 may be lowered during a pause in the contact mechanics test. Lowering the temperature is intended to induce a change in the fracture characteristics of the sample 16 which make certain micromodifications 42 more easily observable.

Figure 30:
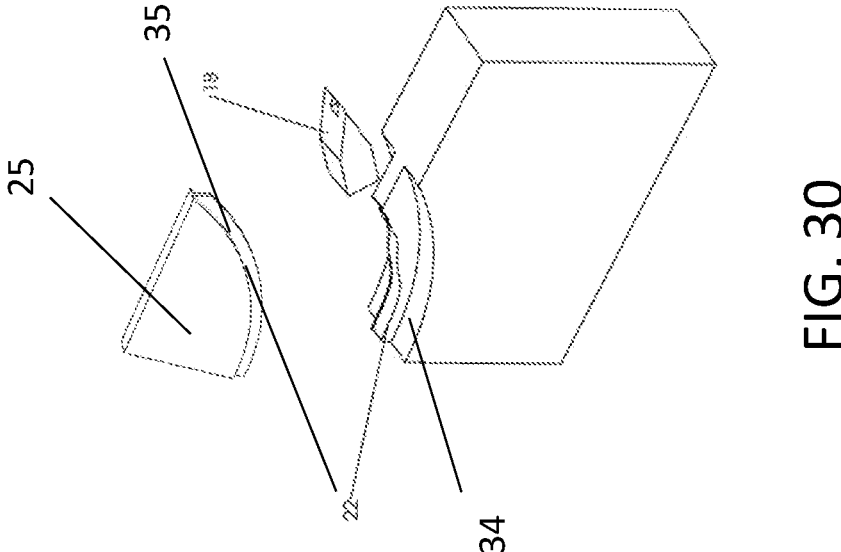
FIG. 30 is a schematic of a material response in which a ligament has been formed on the sample and chip surfaces, according to embodiments of the present invention.

FIG. 30 is a schematic of a material response in which a ligament has been formed on the sample 16 and chip 25 surfaces.

FIG. 31A shows a schematic of a sample 16 with a residual sample surface 34 which features a chevron 60 shaped crack front profile 56. The 'tip' of the chevron 60 is located nearest to the start of the contact mechanics test, as defined by the path trajectory 8, indicating that this is a "negative" chevron shape.

FIG. 31B shows a schematic of a sample 16 with a residual sample surface 34 which features an hourglass 58 shaped crack front profile 56. The 'tip' of the hourglass 58 is located nearest to the start of the contact mechanics test, as defined by the path trajectory 8, indicating that this is a "positive" hourglass shape.

FIG. 31C shows a schematic of a sample 16 with a residual sample surface 34. A contact mechanics test has resulted in a slant 61 shaped crack front profile 56.

FIG. 31D shows a schematic of a sample 16 with a residual sample surface 34. A contact mechanics test has resulted in a crack front profile 56 of an undefined 62 shape.

Figure 32A:
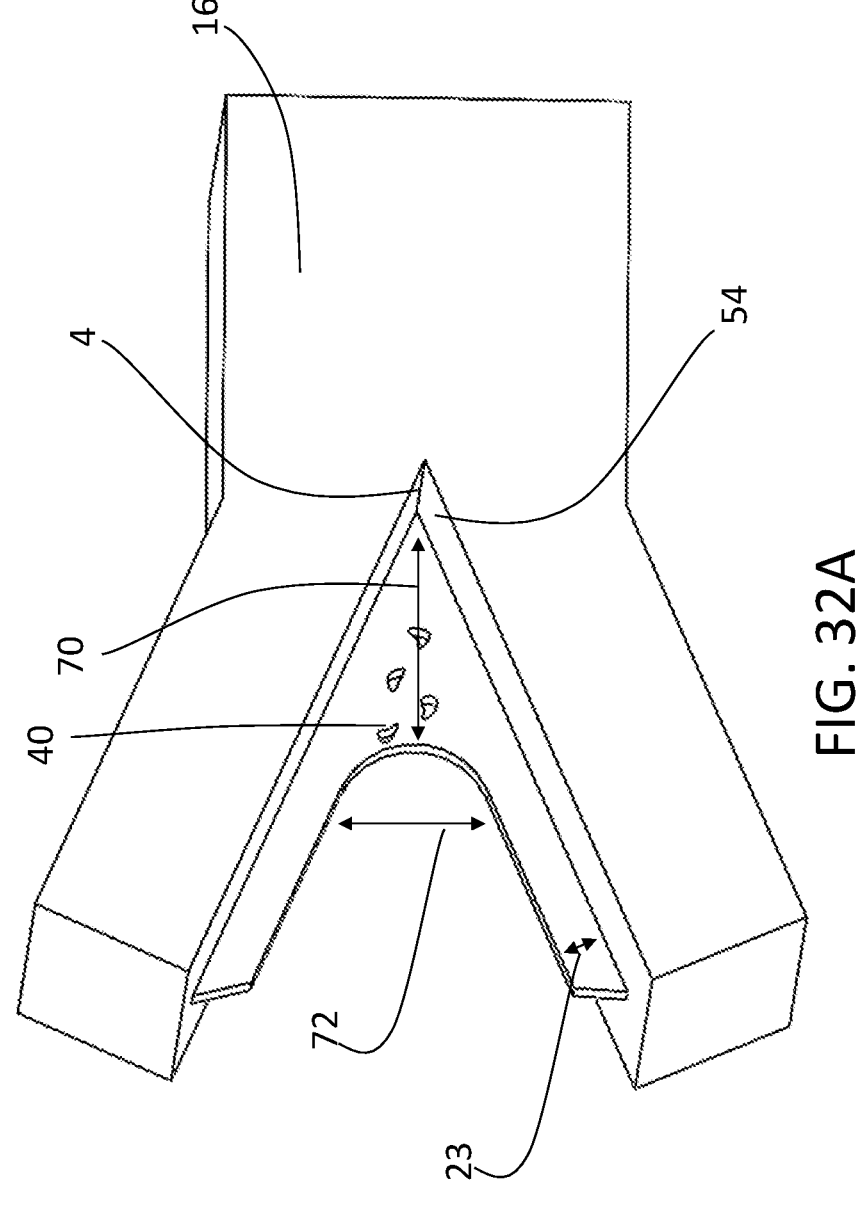
FIGS. 32A-32B are schematics of a perspective view and side view, respectively, of a crack tip profile resulting from the passage of the cutting edge through a sample according to embodiments of the present invention. The lag between the cutting edge and the point of separation in the sample shows the development of microvoids which coalesce as the crack tip grows.

FIG. 32A shows an isometric view of a sample 16 exhibiting various micromodifications 42 due to a contact mechanics test. The passage of the stylus 16 during the contact mechanics test results in a cutting surface 30 and a ligament 22. A lag 70 may be observed between the cutting edge 4 and the crack tip 66, wherein the presence of microvoids 40 is observed as the deformed sample 16 is brought closer to failure.

Figure 32B:
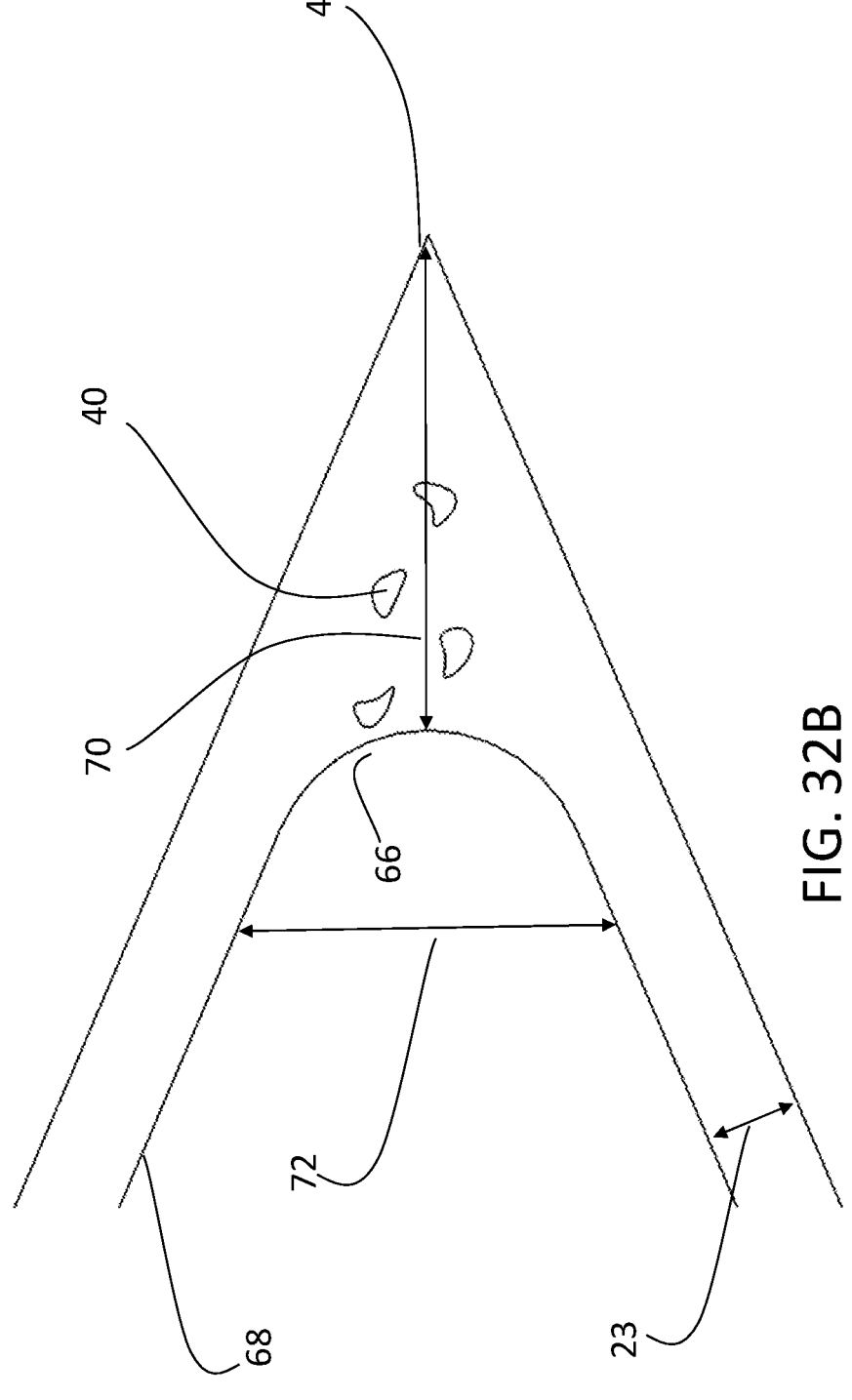

FIG. 32B shows a schematic of a sample 16 exhibiting various micromodifications 42 due to a contact mechanics test. The profile created by the cutting edge 4 is trailed by the crack tip profile 68. The lag 70 between the cutting edge 4 and the crack tip 66 is related to the material toughness and is a function of the materials crack opening displacement 72 and ligament height 23.

The features measured during or after the contact mechanics test, such as described in FIGS. 32A and 32B, may be measured directly in-situ through profilometry while a contact mechanics test is paused, or after the completion of a contact mechanics test. If the chip 25 is not removed during a contact mechanics test by the stylus 18, the chip 25 may be removed by physical means, such as known by one skilled in the art. For example, the sample 16 may be locally cooled, e.g., with liquid nitrogen or other cryogenic liquids, enabling the chip 25 to fracture more easily from the surface of the sample 16 in a brittle manner and may be removed by using pliers or other similar methods. Alternatively, or in addition, the sample 16 may be subjected to a treatment process, such as a "tinting process", with a heat source (e.g., a heat gun), chemical solution, electrical pulse, or other methods, prior to locally cooling the sample 16, allowing the exposed sample 16 surfaces to be more easily distinguished from fracture surfaces formed when the chip 25 is removed. This tinting process can assist in post-test lag measurements.

Figure 33A:
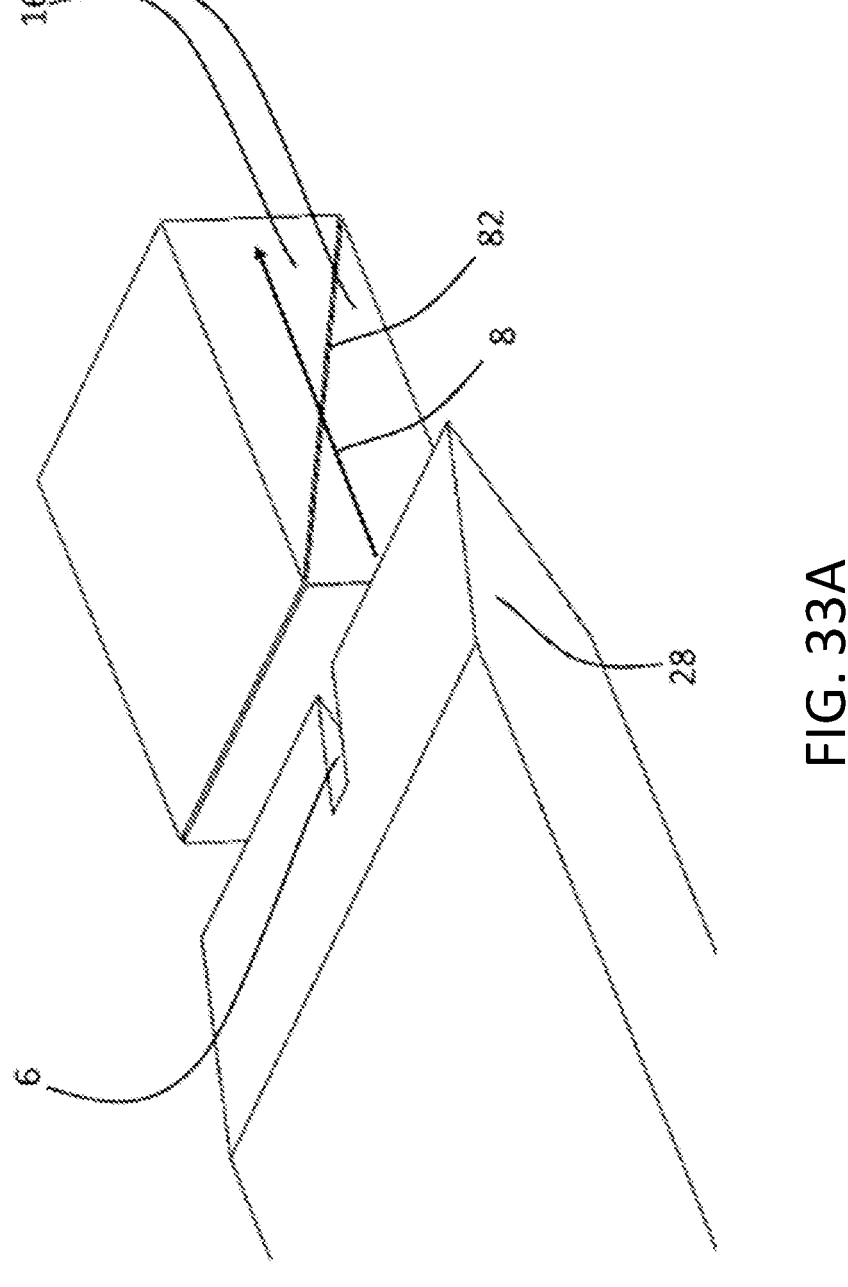
FIGS. 33A-33B show schematics of a stylus engaging a sample having an interface between the same or different materials according to embodiments of the present invention.
Figure 33B:
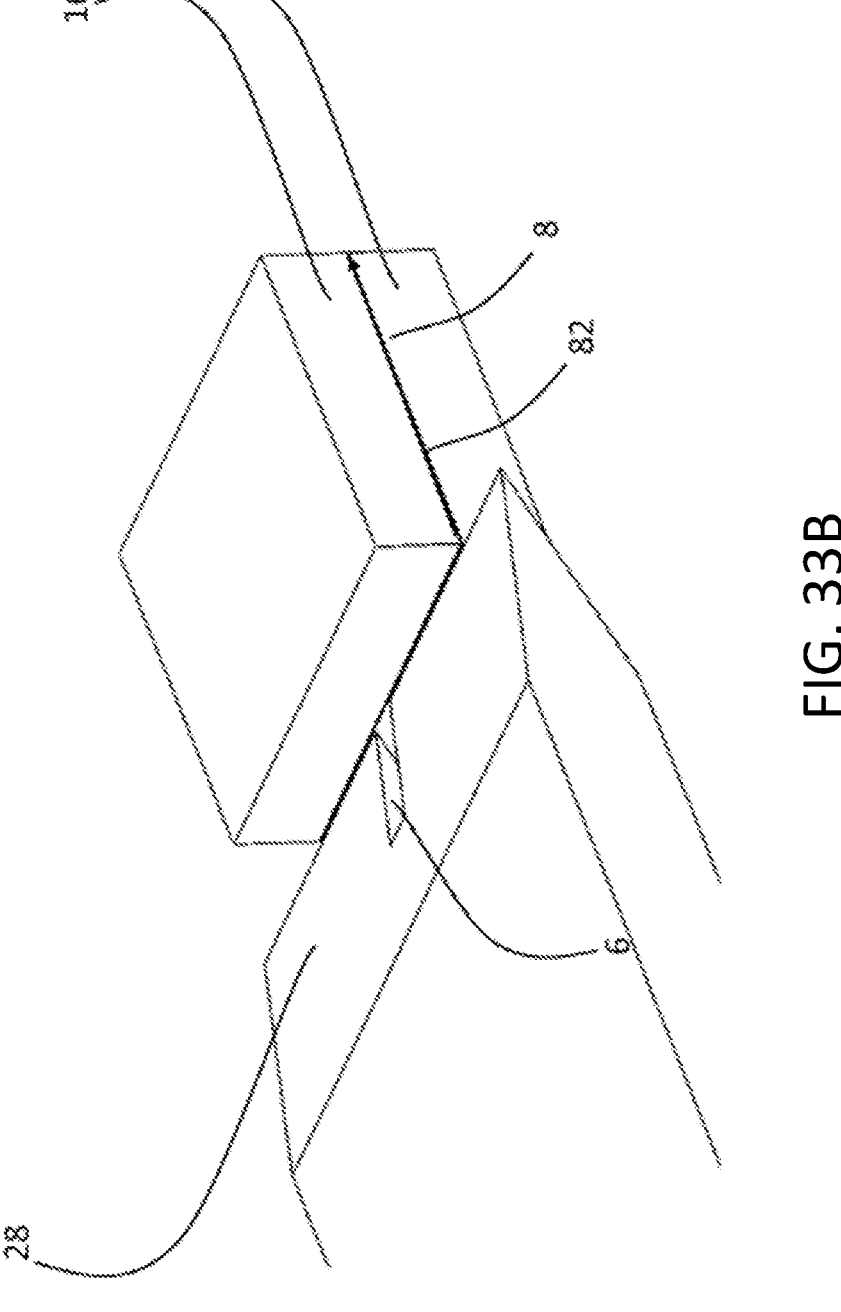

FIGS. 33A and 33B show an embodiment wherein a contact mechanics test is performed on a sample 16 which has an interface 82 between the same or different materials. The stylus 18 may be oriented to perform a contact mechanics test across an interface 82 and into both materials, as shown in FIG. 33A or may be oriented to perform a contact mechanics test moving along the interface 82 of the materials, as shown in FIG. 33B. These contact mechanics tests reveal characteristics of the bond at the interface 82 between the adjacent materials and the variation in material properties across the transition between them.

Figure 34:
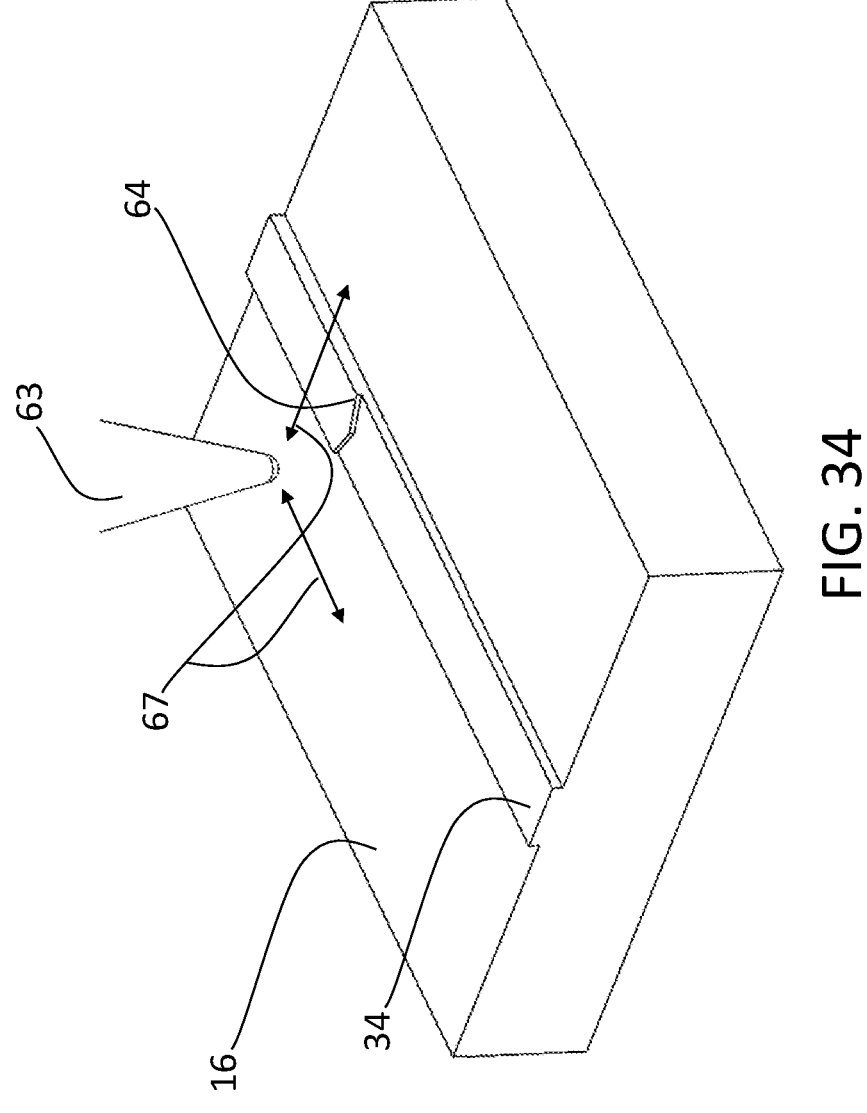
FIGS. 34 and 35 are schematics of a sample being probed by a contact and non-contact profilometer, respectively, in order to characterize the features and topography of the residual sample surface according to embodiments of the present invention.
Figure 35:
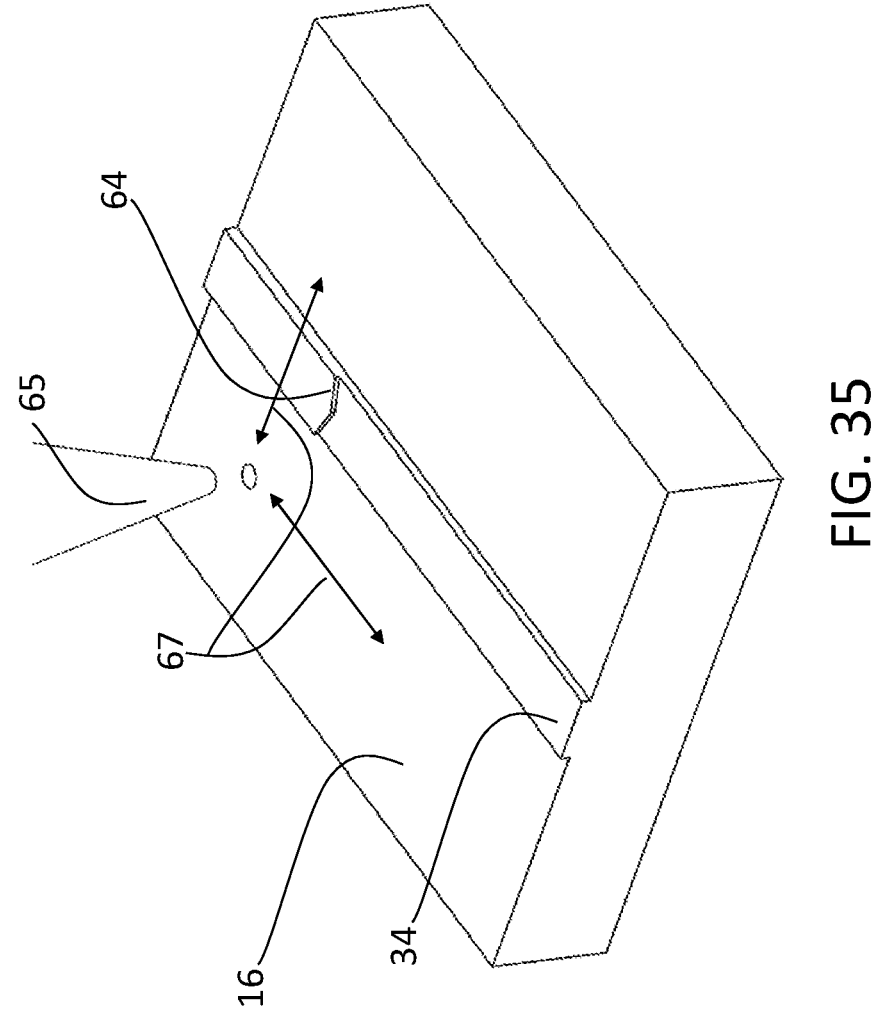

Embodiments of the apparatus may include a profiling device utilized to determine the topography of a residual sample surface 34. FIGS. 34 and 35 show schematics of a sample 16 with a residual sample surface 34 which is being probed by a contact profilometer 63 or a non-contact profilometer 65, respectively. The profilometer having a profilometry path 67 designed to cross over the crack arrest profile 64 and determine characteristics of the residual sample surface 34. The profilometry may be configured to be performed in-situ as well as at a later time and location following the initial performance of the contact mechanics test.

Characteristics of the material response such as ligament height 23 and lag 70 can be shown to correlate to conventional fracture toughness metrics, such as $K_{JC}$, $J_{JC}$, and Charpy V-notch values using regression analysis. Utilizing these parameters from contact mechanics tests along with other known or measured material properties, such as strength, grain size, chemistry, and others, can be used to develop machine learning models that predict toughness properties that normally would be measured with destructive laboratory testing. Additionally, these machine learning models can be supplemented and made more accurate with physical modeling using finite element analysis. With finite element analysis (FEA), a simulation of the contact mechanics test is conducted. A reverse analysis using dimensionless functions may be conducted on the results of the FEA, allowing a set of equations to be developed that convert the results of a contact mechanics test to the desired fracture toughness property.

Embodiments of the stylus 18 described herein may be used with additional components in a contact mechanics test, such as described in U.S. Pat. No. 11,378,502, which is incorporated by reference herein in its entirety.

Although the above discussion discloses various exemplary embodiments of the invention, it should be apparent that those skilled in the art can make various modifications that will achieve some of the advantages of the invention without departing from the true scope of the invention.

What is claimed is:

1. An apparatus for measuring material toughness in a sample using a contact mechanics test, the apparatus comprising:

a stylus having at least two cutting blades configured to engage with the sample and spaced apart at a distance to define a stretch passage between two adjacent cutting blades, each cutting blade having a blade dive surface and a blade lift surface that intersect to form a cutting edge configured to cut the sample as the stylus travels along a path trajectory, each blade dive surface and blade lift surface has a continuous or discontinuous convex profile along the cutting edge each blade dive surface and blade lift surface configured to contact the sample when cutting the sample; and a stylus transport system configured to move the stylus along the path trajectory as the at least two cutting blades cut the sample such that the sample is displaced on at least one side of the path trajectory, the stylus configured to separate the sample at or near the cutting edge of each cutting blade when the stylus transport system moves the stylus and configured to form a ligament in the stretch passage when the sample flows between the two adjacent cutting blades and to induce tension in the ligament due to opposing forces of the at least two cutting blades and the sample.

2. An apparatus according to claim 1, wherein the stylus transport system includes an actuator configured to supply linear motion and/or rotational motion to the stylus.

3. An apparatus according to claim 1, further comprising a set of strain gauges or load cells, coupled to the stylus, configured to measure forces associated with frictional sliding in the sample during a frictional sliding test.

4. An apparatus according to claim 1, further comprising a stylus steering system, coupled to the stylus transport system and configured to move the stylus in any direction relative to the sample.

5. An apparatus according to claim 1, further comprising a sample reference system coupled to the stylus and configured to maintain a reference of the stylus relative to the sample surface.

6. An apparatus according to claim 1, further comprising at least one lateral support coupled to the stylus and configured to provide increased strength to the stylus.

7. An apparatus according to claim 1, further comprising a sample surface measurement device coupled to the stylus transport system and configured to measure characteristics of the sample associated with deforming the sample as the stylus travels.

8. An apparatus according to claim 1, wherein the stylus transport system is further configured to provide movement of the stylus for an indentation test.

9. An apparatus according to claim 1, wherein at least one cutting blade includes a blunting surface along the cutting edge and/or at one end of the cutting edge adjacent to the stretch passage.

10. An apparatus according to claim 1, wherein at least one cutting blade includes one or more flow constraining passages configured to limit flow of the sample into the stretch passage.

11. A method for measuring material toughness in a sample using a contact mechanics test, the method comprising:

providing the apparatus of claim 1;

causing the stylus to engage with the sample; and moving the stylus to perform the contact mechanics test to generate a residual sample surface in the sample and to preserve the residual sample surface in order to provide material toughness measurements of the sample.

12. The method of claim 11, further comprising forming a notch in the sample before causing the stylus to engage with the sample and then causing the stylus to engage with the notch.

13. The method of claim 11, further comprising measuring characteristics of the residual sample surface associated with deforming the sample.

14. The method of claim 11, further comprising measuring reaction forces on the stylus as the stylus deforms the sample.

15. The method of claim 11, further comprising using test conditions and the material toughness measurements to determine the material toughness of the sample.

16. The method of claim 15, wherein the test conditions include stretch passage width, stylus velocity, stylus depth relative to a surface of the sample, sample temperature or combinations thereof.

17. The method of claim 11, further comprising using the material toughness measurements and a K-correlation factor to determine the material toughness of the sample.

18. The method of claim 11, further comprising forming a test structure in a surface of the sample before causing the stylus to engage with the sample, the test structure having a test sample configured to engage with the at least two cutting blades.

19. The method of claim 18, wherein the test structure forms a U-shape or an O-shape in the surface of the sample.

20. The method of claim 18, further comprising removing at least a portion of the test sample from the surface.

\* \* \* \* \*